United States Patent [19]

Volk et al.

[11] Patent Number: 5,673,401

[45] Date of Patent: Sep. 30, 1997

[54] SYSTEMS AND METHODS FOR A CUSTOMIZABLE SPRITE-BASED GRAPHICAL USER INTERFACE

[75] Inventors: Patrick Michael Volk, Kirkland; Michael Breed Robin, Redmond; Edwin Thorne, III, Seattle; JoGene Kapell, Bellevue, all of Wash.

[73] Assignee: Microsoft Corporation, Redmond, Wash.

[21] Appl. No.: 509,083

[22] Filed: Jul. 31, 1995

[51] Int. Cl.[6] ........................................ G06F 3/00
[52] U.S. Cl. .............................. 395/327; 395/356
[58] Field of Search .......................... 395/155–161, 395/650, 700, 326–358, 701; 345/117–120, 145–146, 122–131; 348/7, 12–13

[56] References Cited

U.S. PATENT DOCUMENTS

| | | | |
|---|---|---|---|
| 4,656,603 | 4/1987 | Dunn | 395/159 X |
| 4,896,291 | 1/1990 | Gest et al. | 395/159 |
| 5,247,284 | 9/1993 | Fleming | 395/156 |
| 5,270,689 | 12/1993 | Hermann | 345/145 |
| 5,289,205 | 2/1994 | Torres | 345/125 |
| 5,295,243 | 3/1994 | Robertson et al. | 395/160 |
| 5,303,388 | 4/1994 | Kreitman et al. | 395/159 |
| 5,347,628 | 9/1994 | Brewer et al. | 395/159 |
| 5,392,388 | 2/1995 | Gibson | 395/159 |
| 5,452,413 | 9/1995 | Blades | 395/159 |
| 5,479,268 | 12/1995 | Young et al. | 348/13 X |
| 5,485,197 | 1/1996 | Hoarty | 348/7 |
| 5,513,306 | 4/1996 | Mills et al. | 395/352 X |
| 5,515,486 | 5/1996 | Amro et al. | 395/159 X |
| 5,517,257 | 5/1996 | Dunn et al. | 348/7 X |
| 5,524,195 | 6/1996 | Clanton, III et al. | 395/155 |
| 5,524,196 | 6/1996 | Blades | 395/155 |

OTHER PUBLICATIONS

Six et al., "A Software Engineering Perspective to the Design of a User Interface Framework", IEEE, pp. 128–134 1992.

Myers et al., "Garnet: Comprehensive Support for Graphical Highly Interactive user Interfaces", IEEE Computer, pp. 71–85 Nov. 1990.

Advanced Interface Design Guide, IBM, pp. 25–31, 38–39, 46–47, 63–75, 77–81, 83–87 Jun. 1989.

Foley et al., "Computer Graphics: Principles and Practice", Addison–Wesley Pub., pp. 445–451 1990.

Primary Examiner—John E. Breene
Attorney, Agent, or Firm—Jones & Askew

[57] ABSTRACT

An object-oriented system for generating and displaying control items that allow users of an interactive network to recognize and select control functions via a graphical user interface. The manipulation of the control items on a display screen is linked to a set-top terminal associated with the interactive network. The control items, which can be visible or audible, are associated with control objects. Control objects are arranged in a hierarchy, and can contain one or more child control objects. Attributes of a child control object are inherited from an ancestor control object. A control item can be graphically manipulated independently by drawing the control item into its own sprite, or can be manipulated by drawing the control item into the sprite of a parent. The system provides building blocks of control elements that can be composed and customized to produce versatile interfaces for applications and content.

28 Claims, 15 Drawing Sheets

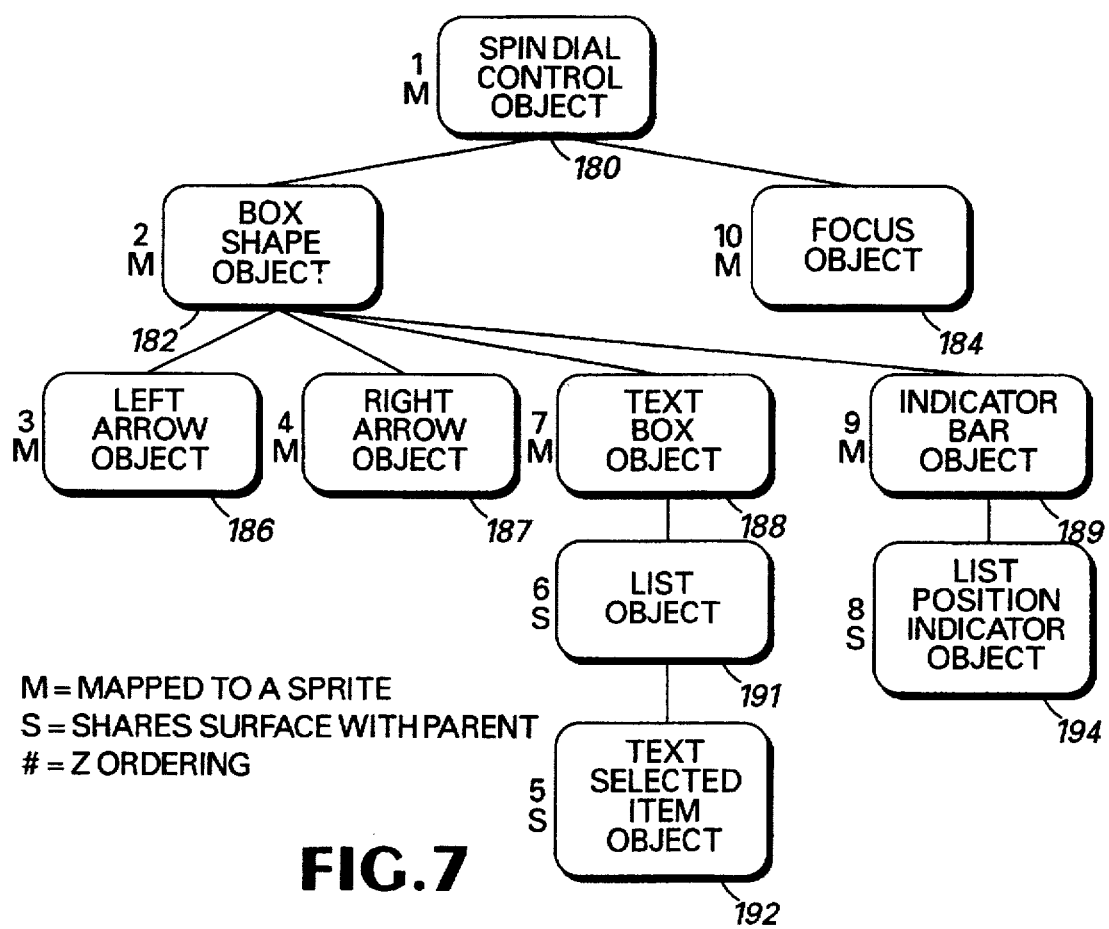
M = MAPPED TO A SPRITE
S = SHARES SURFACE WITH PARENT
# = Z ORDERING
FIG.7
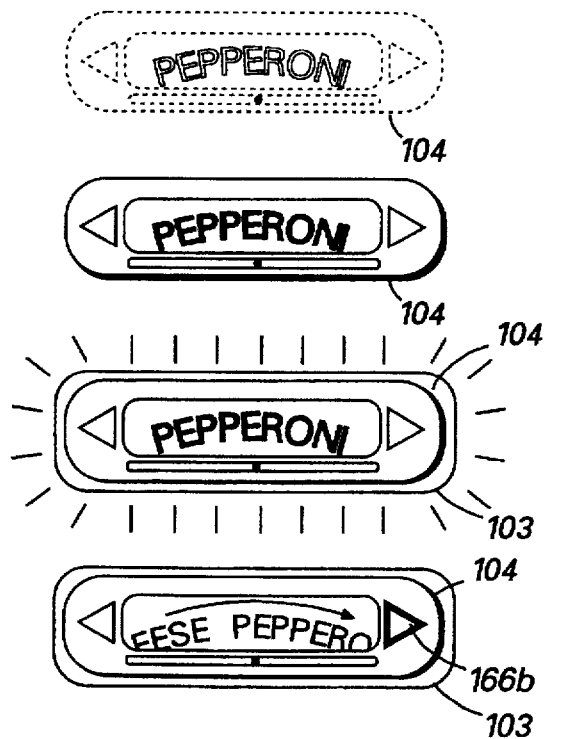
DISABLED FIG.8A
ENABLED FIG.8B
SELECTED/FOCUSED FIG.8C
PUSHED/ACTIVE FIG.8D

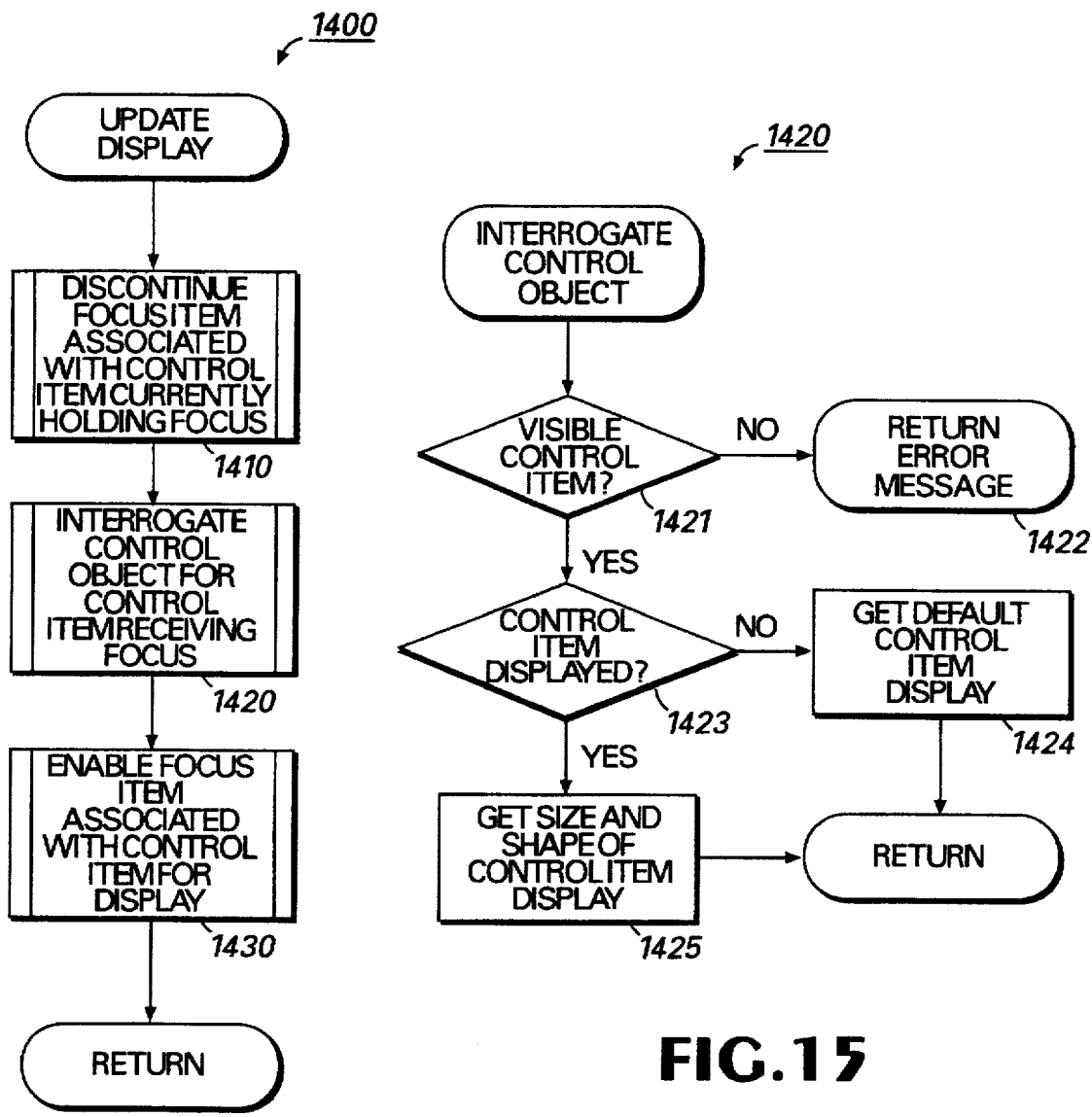

DRAW OBJECTS

SYSTEMS AND METHODS FOR A CUSTOMIZABLE SPRITE-BASED GRAPHICAL USER INTERFACE

TECHNICAL FIELD

The present invention relates generally to a system for presenting control information and, more particularly, to a graphical user or viewer interface for displaying control items representing control functions in an interactive communications system.

BACKGROUND OF THE INVENTION

Cable television systems, sometimes referred to as community-antenna television (CATV) systems, are broadband communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60–65% of all households actually being connected to such communications networks. While cable systems originally had very simple architecture and provided a limited number of different television signals, the increase in the number of television broadcasters, owners, and services over the last several decades has resulted in much more complex modern cable distribution systems.

A typical CATV system for the delivery of television programming to subscribers comprises three main elements: a headend, a distribution system, and subscriber drops.

The "headend" is a signal reception and processing center that collects, organizes and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes the these signals to individual neighborhoods for delivery to subscribers. A modern distribution system typically comprises a combination of coaxial cable and optical fibers with trunk amplifiers periodically spaced to compensate for attenuation of the signals along the line.

"Subscriber drops" are taps in the distribution system that feed individual 75 Ω coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. For downstream transmissions, typical CATV systems provide a series of video channels, each 6 MHz in bandwidth, which are frequency division multiplexed across the forward band, in the 50 MHz to 550 MHz region of the frequency spectrum. As optical fiber more deeply penetrates the service areas with hybrid optical fiber/coaxial cable (HFC) configurations, the bandwidth of the coaxial cable portion is expected to increase to over 1 GHz, thereby increasing the number of available channels for potential services.

The advent of pay-per-view services and other interactive television applications has fueled the development of bi-directional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having HFC configurations, multiple service operator (MSOs) can use the additional channels gained by this wider bandwidth network to provide many new subscriber services. This ever-expanding deployment of fiber optic technology supports the implementation of an "interactive network" to allow a subscriber to obtain desirable service of programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

Focusing upon an interactive network supporting interactive television services, this bi-directional communications medium combines aspects of television technology with conventional computer technology. An interactive network system will superimpose, upon a traditional television display, a number of "control items" representing television service functions that may be executed by the viewer. Selection and subsequent execution of a control item by a viewer may cause an "action command" to be transmitted from the viewer to the headend. For example, a viewer may order goods, select programming, or respond to an interactive program through execution of control items. Therefore, the primary distinction between traditional television programs and interactive television services is the ability of the viewer to send commands upstream via the distribution network to the headend, thus making the television system "interactive."

The delivery of a variety of interactive services via a broadband network distribution system raises the critical issue of defining an efficient mechanism for presenting both operation and program-related information to an audience of possible consumers representing diverse technological backgrounds and interests. The "user interface" for an interactive network should appeal to a "typical" viewer of standard broadcast television programs and should be easy for this mythical person to understand and to use. Because computer users reflect only a portion of the overall audience for interactive services, it is deskable that the features of this user interface be based upon the assumption that the typical viewer is not familiar with user interface customs that are otherwise acceptable and understood by the computer literate community. In particular, some viewers may have little or no computer background, and may be unfamiliar with traditional computer graphical user interfaces. Therefore, there is a need for an user interface for an interactive network system capable of communicating useful information to a viewer who is otherwise unfamiliar with computer protocols or interactive services.

Typically, viewers of an interactive television service will be located several feet or even several yards away from a display screen presenting the service. Thus, displayed items of the user interface should be readily readable from an acceptable viewing distance that typically separates the viewer from a television screen. In view of this separation of the viewer and the display screen, it is also desirable that displayed control items representing service control functions be controllable with an input device familiar with this typical television viewer, such as a handheld remote control. However, this remote control may have significantly less communication capability than a keyboard and mouse system used on conventional computer systems. Thus, there is need for an interactive network system that provides a simplified display mechanism, and a highly effective means for communicating control information to the viewer.

In the computer industry, a graphical user interface (GUI) or system is typically used to supply information, including control items, to users of computer systems. However, the conventional features of a graphical user interface for a conventional computer are not readily transferable for use by viewers in an interactive network system. A different "graphical viewer interface" is preferred for use in such an interactive network system.

It is noted at this juncture that the terms "graphical user interface" and "GUI", which are commonly used in connection with computer environments, and "graphical viewer interface" and "GVI" are sometimes used interchangeably. It should be understood that features of one environment can sometimes, but not always, be used in the other environment.

In the environment of a conventional computer system, the entire display screen is available for providing information to the user. On the other hand, there is a limited portion of a display screen that can be safely used in a consistent manner for presenting television services in an interactive environment. In addition, the user of a conventional computer usually sits very close to the screen, perhaps only a few feet away, and therefore can read relatively small print on the computer screen. In contrast, viewers in an interactive network environment are typically separated from the display screen by a much greater distance. Moreover, users of conventional computer systems are typically computer literate and willing to resort to a user manual to gain more information on how to use the system. Viewers of interactive television services supplied by an interactive network, on the other hand, may be much less likely to be sophisticated in the use of computer systems, and far less likely to resort to the use of a manual to determine how to use the system.

Another distinction between conventional computer systems and interactive network systems is that a computer system typically presents prompts to the user in responding to receiving commands from one source, the user. In contrast, for an interactive network environment, prompts such as control items will generally be presented in response to two sources—the headend and the viewer. Therefore, a viewer of an interactive network system may require more explicit indications of a prompt, and more explicit indications of how to respond. Accordingly, the meaning of control items displayed on the screen in an interactive network environment should be patently clear to the viewer based on the appearance of the control items alone. To accommodate this need, it would be advantageous if a graphical viewer interface for an interactive network system embodied an improved means for conveying basic control related information to the viewer. It would also be advantageous in an interactive network environment to have a more visible, more demonstrative method for indicating "focus", that is, which of a plurality of control items is enabled to receive a user action.

In addition, there are problems associated with attempting to directly transfer conventional computer graphical user interface techniques for use in an interactive network environment. First, a keyboard or mouse is typically required to navigate amongst a plurality of control items and perform the single- and double-click functions necessary to change focus and invoke items with focus in conventional computer graphical user interface systems. In contrast, for an interactive network environment, the viewer will typically use a handheld remote control that generally supports only a limited set of commands via the use of a directional navigation thumbpad and an action button.

For example, a handheld remote control unit may only have a single "action" button used to activate a command. If there are more than one control item displayed on the screen, it is generally appropriate that only a single control item have focus, and thus be enabled to receive action if the action button is pressed. Changing focus from one control item to another one requires a different sort of action, that of navigating from one control item to another control item. Therefore, the mouse button-click method for indicating a viewer's desire to change focus is not directly applicable in an interactive network environment.

Second, the methods of indicating which control item has the focus in a conventional computer environment may be insufficiently communicative in an interactive network environment. For example, simply bringing items from the background to the foreground, or using a focus ring of illumination, may not be sufficient to impart focus-related information to the viewer of interactive television services. Unlike the background of a conventional computer display system (i.e., the "desktop"; the surface on which control buttons, icons, etc. are displayed), the background in an interactive network system may appear very busy, as may be the case when a movie, television program, or video game is playing.

In view of the foregoing, it will be appreciated that the use of visual and/or audio cues would be highly desirable for leading an user through the various control operations of an interactive network. Indeed, the popularity of "on-screen" programming for the operation of video cassette recorders (VCRs) is highly indicative of the need for visual indicators that are suggestive of the underlying control operation. For example, one or more control items or images could be displayed to represent various control functions associated with the operation of the interactive network. However, based upon the limited "usable" real estate for displaying such control images, as well as the dynamic nature of programming information presented by the interactive network, there is a need for generating control items that are dynamic, exciting, and highly visible to users, and for "highlighting" or focusing a currently selected control item.

In summary, for an interactive network environment, there is a need for a user interface having simplified user interface controls that are optimized in both appearance and behavior for operation by users familiar with broadcast television equipment. The control functions of the user interface are preferably operable with a handheld input device, such as a remote control. It is desirable for these control functions to be easily selected for operation by the user with the input device and for the selection of a control function to be readily communicated to the user. The present invention addresses these issues and related concerns by providing a user interface designed for use in the environment of an interactive network.

SUMMARY OF THE INVENTION

The present invention addresses the need within the interactive network environment for a system and method for constructing and displaying a control item on a display screen and for graphically manipulating user controls imparted to the control item via a user input device. The control item thus constructed allows a user to readily recognize which control function has been selected for operation.

Within the interactive network environment, control items are presented by an output device, such as a television display or monitor, to represent the control functions for the interactive network. A focus indicator or frame can be placed proximate to a control item to visually indicate that the control item has been currently selected by the user to enable the corresponding control function. To change control functions, the user can navigate by tabbing or with a directional keypad on the remote control unit from one control item to another to select another control function. The focus indicator moves among displayed control items until the user places the focus indicator proximate to a desired control item, thereby "selecting" this control item and its associated control function.

The present invention can therefore be used to support the operation of control functions associated with the communication of programming information by the interactive network. Programming information, including one or more program modules, can be communicated between a subscriber's set-top terminal and a headend via a distribution network typically implemented by a combination of optical fiber and wide band coaxial cable. An output device, such as a television display or monitor, can be connected to the set-top terminal for presenting the control items to the user. These control items are typically presented as visual objects located at various locations on a display provided by the output device. These control items can include frames or containers containing graphic images, animation, video, text, and controls. Typical control items include: buttons for executing a command for indicating a preference, such as a push button for executing a single specific command; and lists for allowing a user to select an item from a list of items, including spin dials and spin lists.

More particularly described, the present invention provides, in a computer system for running program modules, a method of displaying a control item on a display screen and for graphically manipulating user controls imparted to the control item via a user input device. The method comprises steps including providing a plurality of control objects, each of the plurality of control objects having at least one control item associated therewith. The control objects are arranged in a hierarchy with at least one parent control object and at least one child control object associated with the parent control object. A parent control item associated with the parent control object is displayed on the display screen, and a child control item associated with the child control object is displayed on the display screen. In response to a predetermined first condition, such a under program control, the parent control item and the child control item are manipulated to cause a first predetermined user interface effect. In response to a predetermined second condition, the child control item is manipulated relative to the parent control item to cause a second predetermined user interface effect.

In the preferred embodiments, the user input device is a handheld remote control device coupled to an interactive television set-top terminal. The display screen is a television set coupled to the interactive television set-top terminal.

The parent control item can comprise a control button of various types, as well as composite control items comprising a collection of control items associated with other child control objects. For example, a composite parent control item can be a spin dial including child control elements of a graphical box control elements and an arrow control elements. The user can manipulate the arrows to scroll amongst various choices displayed on the screen (as text elements), by manipulating the user input device, e.g. remote control device.

The control items provided in the present invention comprise various audiovisual elements. For example, the control item can be selected or assembled various control elements such as a shape item, a text item, a picture item, a sound item, a list item, a video item, or an alignment item. The items or element can be combined in various ways to construct various types of control items that possess various audiovisual features.

The predetermined first condition that causes the user interface effect is typically generated under program control of an application program that incorporates a program module implementing the invention. For example, the predetermined first condition can comprise the relocation under program control of a parent control item from a first predetermined location to a second predetermined location in a series of successive display frames, with the first predetermined user interface effect comprising the relocation of the parent control item and the child control item while maintaining the spatial relationship between the parent control item and the child control item.

Similarly, the predetermined first condition can comprise a change to a visible attribute of the parent control item in a series of successive display frames. Accordingly, the first predetermined user interface effect can include a change of the visible attributes of the parent control item and the child control item.

Notions of inheritability are provided by the object-oriented structure of the invention. Predetermined properties of the parent control item associated with the parent control object can be imparted to the child control item associated with the child control object. Inheritability simplifies the programming of user interface effects, since manipulation of a parent control item causes all associated child control items to experience the same manipulation, movement, visual properties, etc.

Nonetheless, child control items can be manipulated separately and independently from their parents. Accordingly, a second predetermined condition can cause the relocation under program control of the child control item from a first predetermined location to a second predetermined location in a series of successive display frames, with the resultant second predetermined user interface effect being the relocation of the child control item independently of the parent control item.

Similarly, the predetermined second condition can comprise a change to a visible attribute of the child control item in a series of successive display frames, and the second predetermined user interface effect can be the change of the visible attributes of the child control item independently of the parent control item.

Preferably, various control items are drawn using a sprite-based engine. Control items associated with control objects can have their own sprite, in which case such control items can be manipulated independently. Child control items can be drawn into the sprite surface of a parent, in which independence of manipulation of the child control item is absorbed into the parent.

Accordingly, it is an object of the present invention to provide a customizable, sprite-based graphical user interface, and systems and methods for constructing same.

It is another object of the present invention to provide a system for generating and displaying control items on a display screen associated with an interactive network.

It is another object of the present invention to provide a system for supplying visual cues which enhance a user's ability to understand and operate a program module within the environment of an interactive network.

It is another object of the present invention to provide a system for supplying information via an output device about the selection of a control item representing control functions of a program module and other control items available for selection.

It is another object of the present invention to provide an object-oriented toolkit for constructing user interfaces for use in an interactive television network.

These and other objects, features, and advantages of the present invention may be more clearly understood and appreciated from a review of the following detailed description and by reference to the appended drawings and claims.

BRIEF DESCRIPTION OF THE DRAWING FIGURES

FIG. 7 is a diagram illustrating the hierarchy of control elements utilized in constructing the exemplary "spin dial" type control item of FIG. 5.

Figure 5:
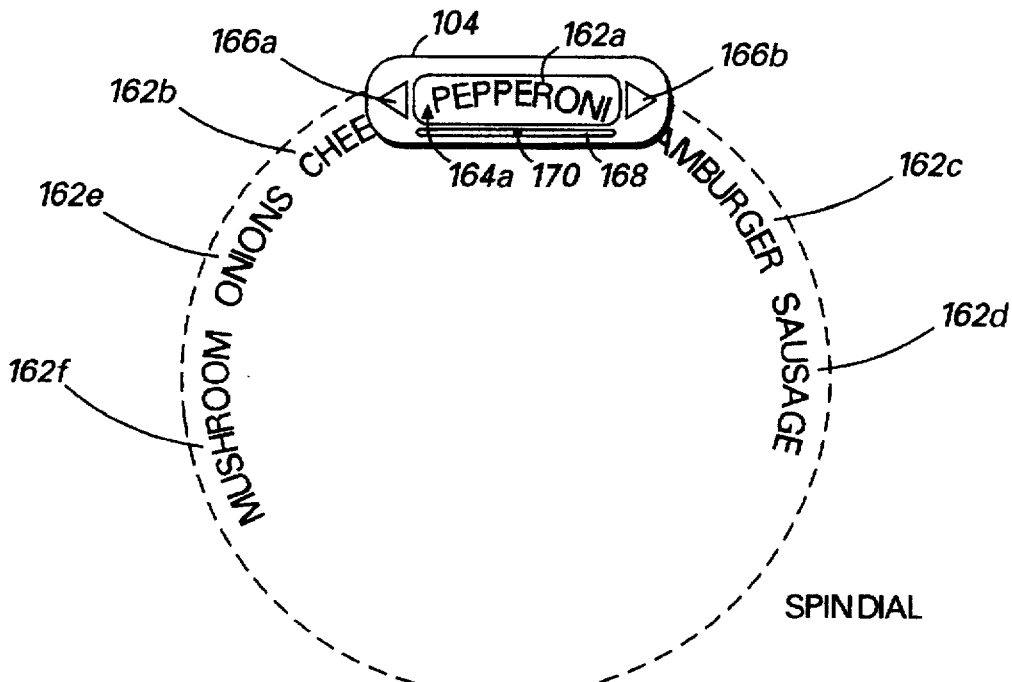
FIG. 5 is a diagram illustrating the operation of an exemplary "spin dial" type control item constructed in accordance with the present invention.

FIG. 8, consisting of FIGS. 8A–8D, illustrates various display states of the exemplary "spin dial" type control item of FIG. 5.

FIG. 9, consisting of FIGS. 9A–9D, illustrates an animated sequence of views of the exemplary "spin dial" type control item of FIG. 5.

Figure 10:
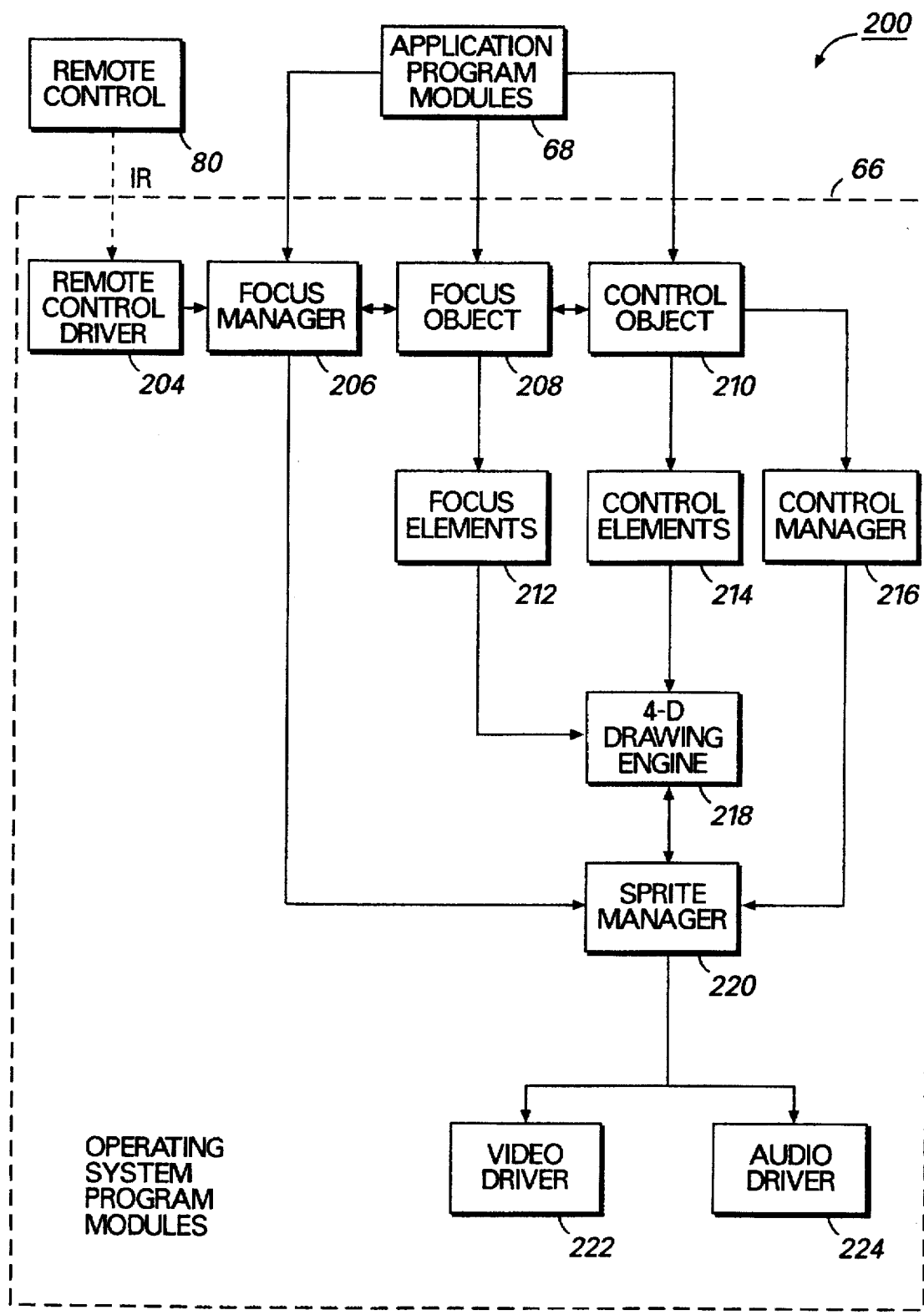

FIG. 10 is a block diagram illustrating the components of a program module for implementing the preferred embodiment of the present invention.

Figure 11:
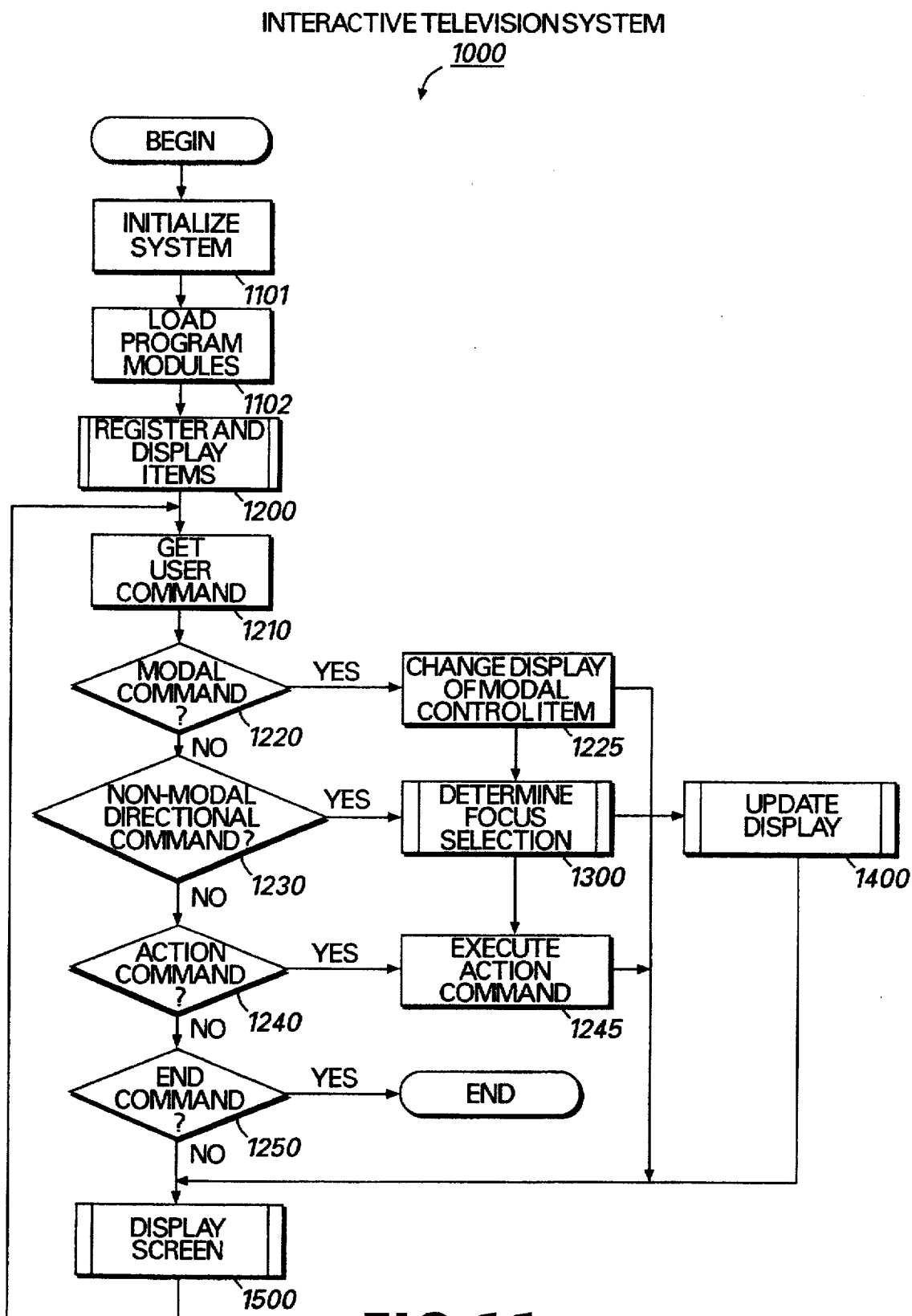

FIG. 11 is a logical flow diagram showing the steps of a computer-implemented process for supplying information via an output device about the selection of a control item representing a control function and other control items available for selection in an interactive network system supporting interactive television programs.

Figure 12:
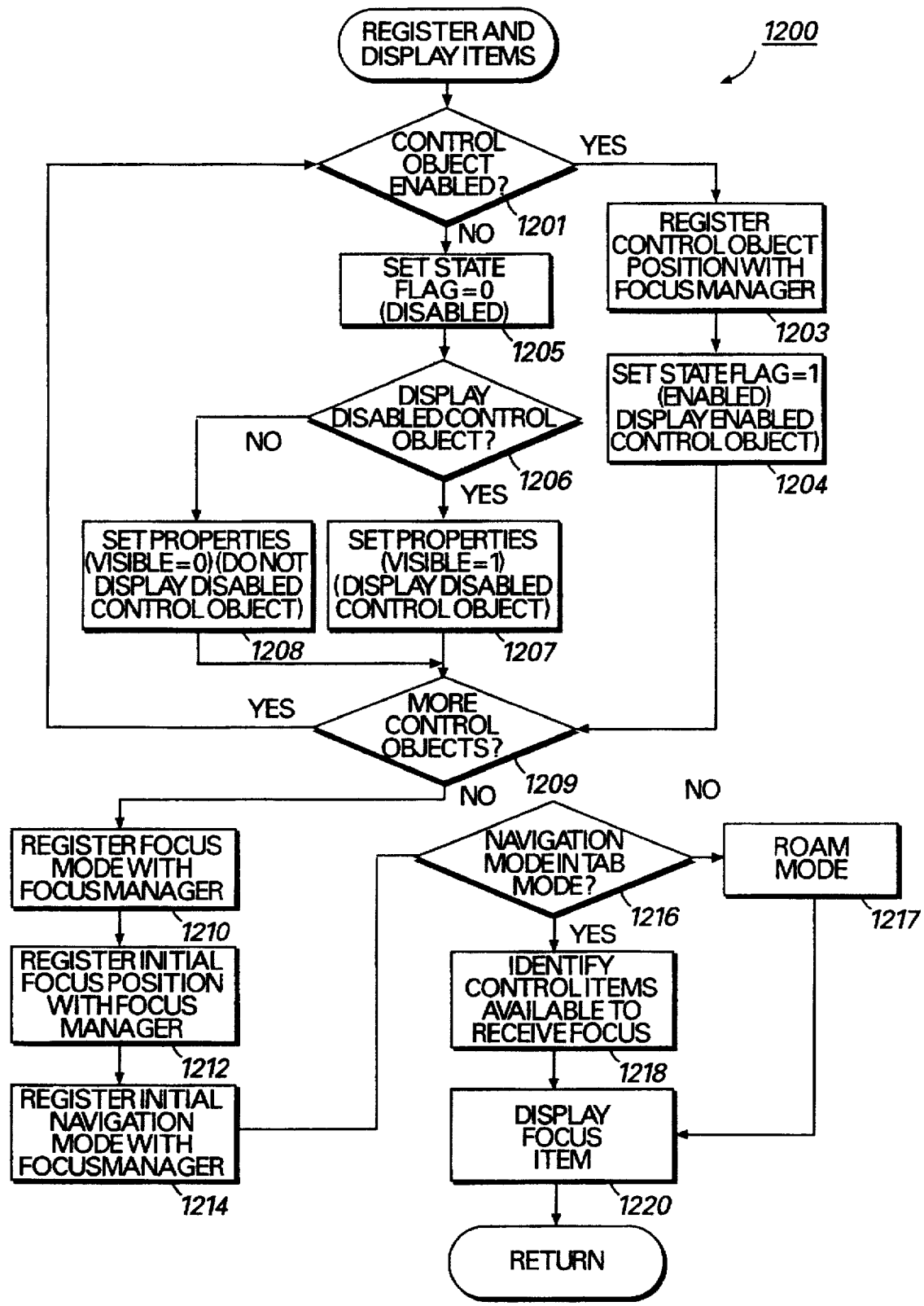

FIG. 12 is a logical flow diagram showing the steps of a computer-implemented process supporting the registration and display of control items and focus items.

Figure 13:
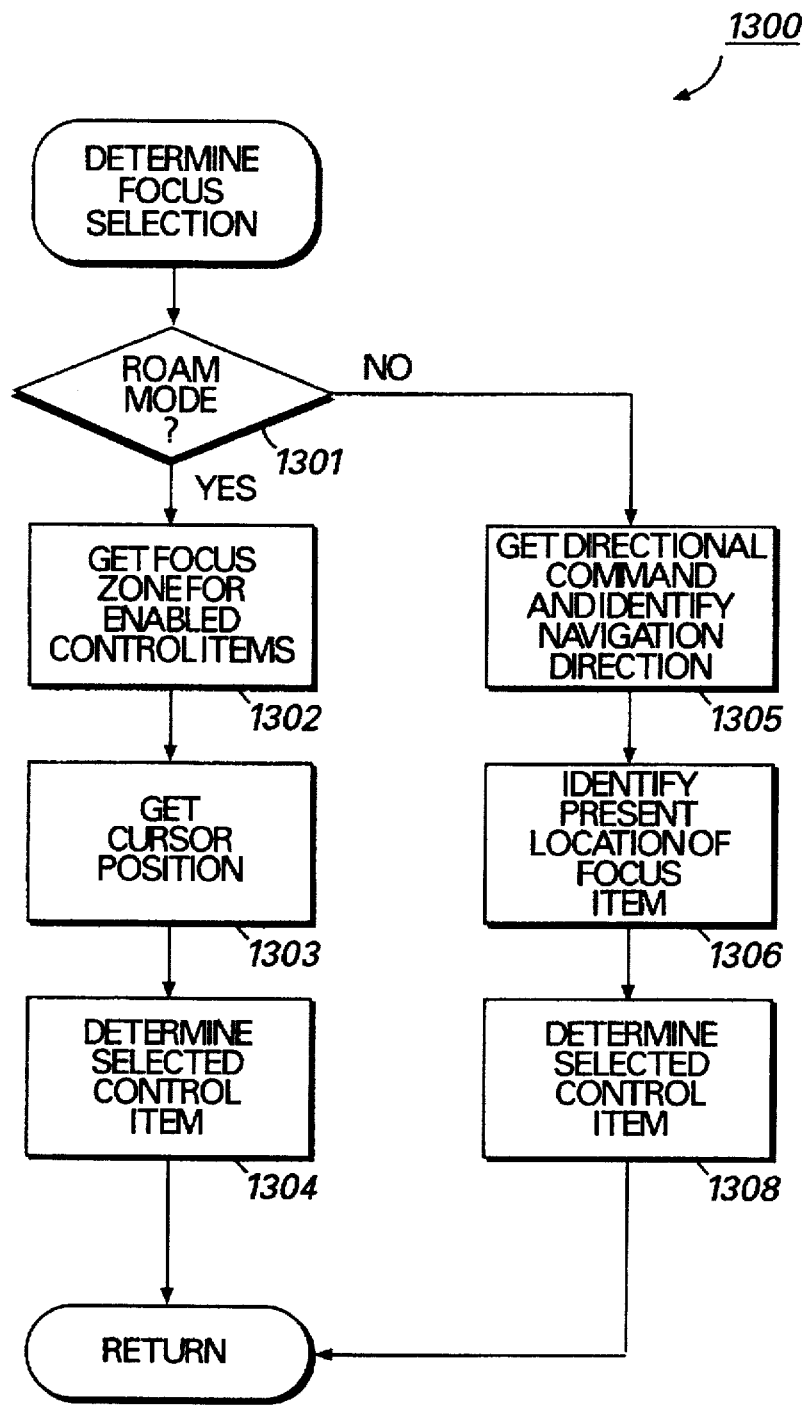

FIG. 13 is a logical flow diagram that illustrates the steps of a computer-implemented process for determining focus selection.

FIG. 14 is a logical flow diagram that illustrates the steps of a computer-implemented process for updating the display of the focus item on a graphical viewer interface.

FIG. 15 is a logical flow diagram that illustrates the steps of a computer-implemented process for interrogating a control object.

Figure 16A:
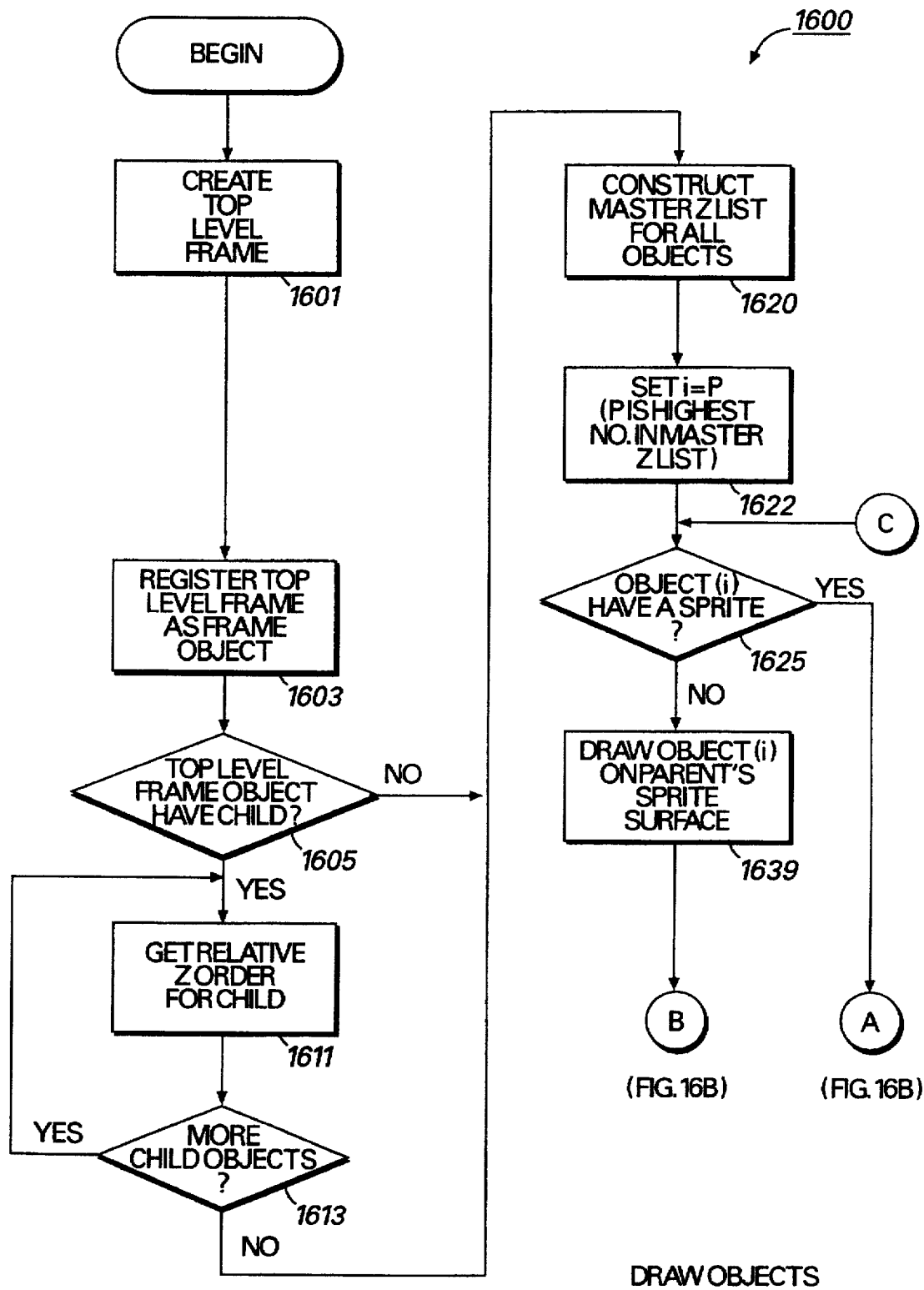
Figure 16B:
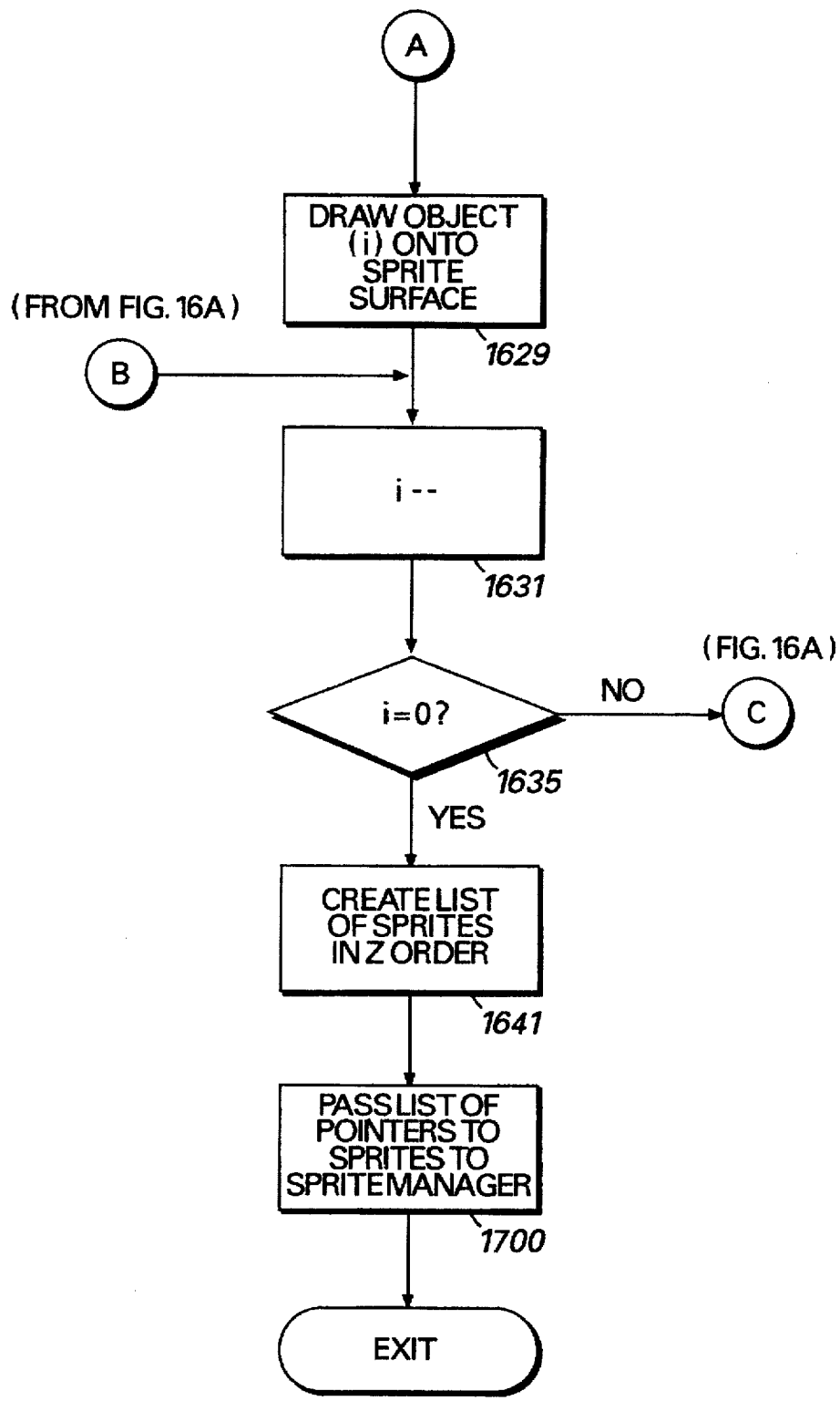

FIG. 16, consisting of FIGS. 16A–16B, is a logical flow diagram that illustrates the steps of a computer-implemented process for drawing control elements of a control item constructed in accordance with the preferred embodiment of the present invention.

Figure 17:
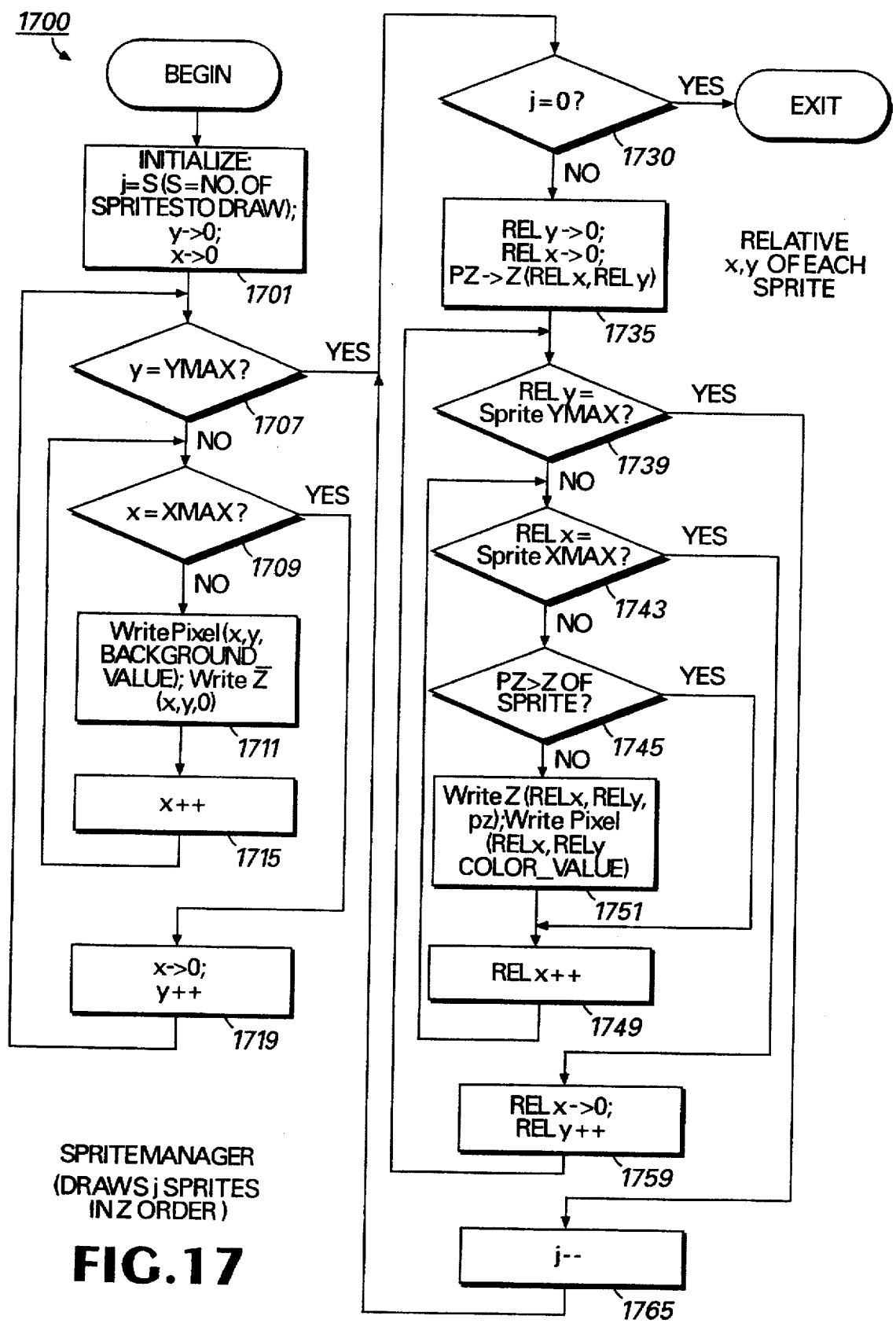

FIG. 17 is a logical flow diagram that illustrates the steps of a computer-implemented process of the Sprite Manager constructed in accordance with the preferred embodiment of the present invention.

DETAILED DESCRIPTION OF THE PREFERRED EMBODIMENTS

The preferred embodiment of the present invention is directed to sprite-based graphical user or viewer interface for an interactive network system that can deliver a variety of services, including entertainment, information, and transaction services, to consumers via an interactive broadband network. This user interface, which is typically presented as a graphical viewer interface via an output device, such as a display or monitor, can include one or more "control items" or images representing various control functions associated with the operation of the interactive network. For example, the user interface can include control items representing functions for controlling a display of available program options for interactive network services. The present invention also provides a system for "highlighting" (i.e., focusing) the currently selected control item. The innovative solution provided by this system addresses the requirements of limited display "real estate" for displaying such control images, as well as the dynamic nature of programming information presented by the interactive network system.

Although the preferred embodiment will be generally described with respect to a representative interactive network service—an interactive television system for delivering television programs and related information—those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Likewise, those skilled in the art will also appreciate that the present invention can be extended to communicating control information within the general purpose computing environment. Specifically, the present invention can support graphical user interfaces for displaying control information on general purpose computer systems, such as desktop computers, portable computers, and handheld computers, including personal digital administrators.

The detailed description which follows is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Definitions

As used herein, an "object" refers to a software element comprising an associated set of function members and data members accessible through a set of predefined interface commands. For the preferred operating environment of an interactive network system, an object may comprise function members and data members that cause a visual and/or audio display to manifest on an output device. For example, an object may include bitmaps and instructions that cause an animated cartoon figure to move across a television screen, together with a synchronized sound track playing over a speaker.

As used herein, a "control object" is an object capable of being selected and executed by a viewer to cause a command to be generated and transmitted to another object or device. For example, in a "Video On Demand" context, a control object executed by a viewer may cause a command to be transmitted from the set-top terminal via the distribution network to the headend. In turn, this causes the selected video to be transmitted from the headend to the set-top terminal. In other contexts, such as in a video game context, control objects may generate and transmit commands that are acted upon entirely within the set-top terminal and equipment connected on the viewer end of the set-top terminal.

As used herein, a "control item" is an aspect of a control object that is perceptible to a user, such as a screen display or an audio track. Thus, when a viewer "executes a control item" displayed on the screen, function members of the associated control object may be activated which cause the appropriate response to occur.

As used herein, a "control element" is an object that is associated with a control item or a component of a control item. A control element is typically a building block, such as a frame, geometric shape, background color, or text string, from which more complicated control items may be constructed.

As used herein, a "focus object" is an object, preferably separate from a control object, which causes a display to be presented to the viewer to indicate that a particular control item is "selected" by receiving focus. For example, a focus object may operate to alter the view of the selected control item, or to associate a separate focus item with the selected control item. When a control item receives focus, a function member of the control object associated with the selected control item can be executed in response to an action command transmitted via an input device.

As used herein, a "focus item" is an aspect of a focus object that is perceptible to a user, such as a screen display or a sound track. For example, in a "Video On Demand" context, control items embodied as visual "buttons" may be displayed to a viewer, wherein each button represents a video that the viewer may select for viewing. A focus item may also be displayed to highlight or otherwise emphasize a particular one of the buttons. This supplies an indication to the viewer that the particular video associated with the highlighted button will be chosen if the viewer communicates an action command. A focus item may be present as an aspect of a control item or as a separate item.

As used herein, a "focus element" is an object that has associated with it a focus item or a component of a focus item. A focus element is typically a building block, such as a frame, background color or text element, from which more complicated focus items may be constructed.

As used herein, a "sprite" is a small (relative to the total display area), prestored bitmap or image that is mixed with the rest of a displayed image at the video level. Sprites are generally implemented as a combination of circuitry and software methods, which operate to retrieve a sprite image from a predetermined memory location and to mix it with other video images to form the desired display image on a output device. The location of the sprite at any time relative to the displayed image is typically specified in data storage registers. Altering data values maintained in the registers via software methods causes the sprite to move. Sprites may hide portions of the displayed image at each pixel (e.g., by providing appropriate alpha values for the pixels in the sprite), or may be blended with the pixel values of the displayed image. Sprites are often used to implement cursors and to generate animated images by moving the sprite, or a succession of related sprites, on a background image.

Given the above definitions, it will be appreciated that the visual image presented by a control item or a focus item may be composed of one or more sprites. In the present invention, control objects to be displayed are associated with sprites that are displayed on a display screen by a Sprite Manager that handles the display.

For example, a control item may be displayed based upon the underlying characteristics of a "parent" control object containing one or more of a standard set of control objects or "children". Each of these children can contain other control objects, as well as their own control elements. A control element is an object in its own right, which may contain data members comprising one or more sprites and function members that may cause the sprites to be presented to a viewer. It will therefore be appreciated that to cause a selected parent control object to display its control item, the control object may call one or more related other control objects. In turn, these control objects can call other related control objects. The control elements of the control objects that collectively comprise the parent control object are displayed in Z order by a Sprite Manager that causes the display of the control item to appear on a screen display. In this manner, a control item can generally be thought of as being constructed by a number of sprites.

Interactive Television Operating Environment

Figure 1:
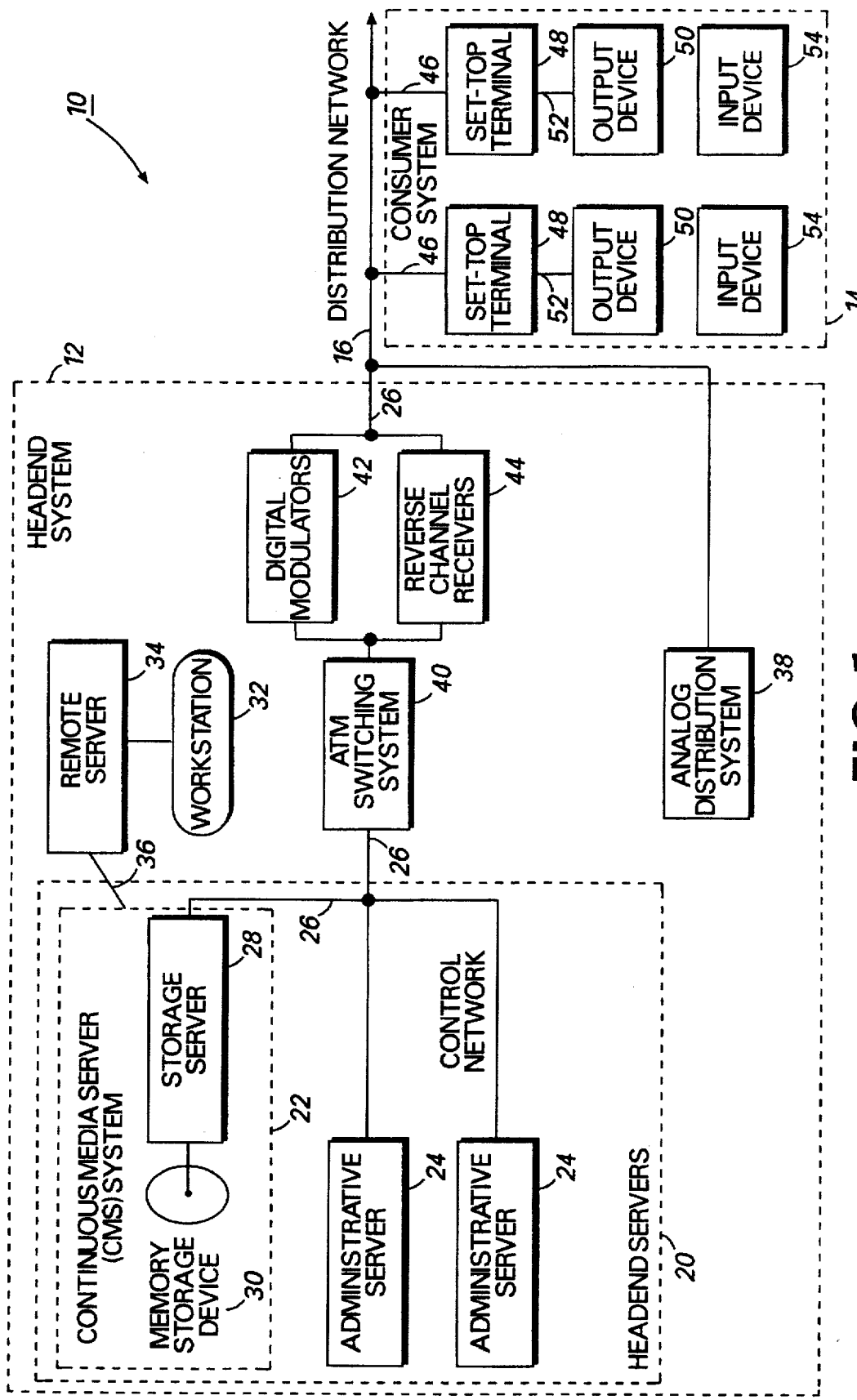
FIG. 1 is a diagram of the preferred environment of the present invention.

Turning now to the drawings, in which like numerals indicate like elements throughout the several figures, FIG. 1 illustrates the operating environment for an interactive network system. Referring to FIG. 1, the interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, data object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. Also, administrative servers 24 can be used for data object storage to support network services, such as character-based data associated with VOD services. These data object storage-type servers can support the distribution of video and audio streams by the CMS system 22, and can be implemented as SQL (Structured Query Language) servers.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system 14 and one or more upstream channels for carrying transmissions from the consumer system to the headend system. This bi-directional communications network supports delivery of programming information via the headend system 12 to each consumer, and the delivery of requests for programing information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional compression schemes, such as MPEG-1 and MPEG-2. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices, such as digital modulators 42 and reverse channel receivers 44. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal or box 48 located at the consumer's location. This combination of the drop cable 46 and the set-top terminal 48 operates as a "tap" into the distribution network 16, and allows the consumer to (1) receive program modules and programming information distributed by the headend system 12, and to (2) transmit requests or instructions to the headend system 12. For example, the set-top terminal 48 can accept and convert signals carrying programming information to a format compatible for presentation by an output device 51), such as a television or a computer system. This output device 50, which can connected to the set-top terminal via a conductive path 52 such as coaxial cable, preferably includes a receiver and a display or monitor for receiving and displaying programs and program-related information.

Those skilled in the art will understand that the output device 50 can be implemented as a combination of separate components, such as a receiver and a monitor, or as a single component, such as a conventional television or a general purpose computer system. However, it will be further understood that the output device 50 is not limited to a conventional television or computer display, but can be implemented by other well known mechanisms for presenting visual images to a viewer.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a handheld control, a keyboard, a mouse device, a game control, a joystick, a pen or stylus, a trackball, a track pad, or other data input devices.

For the preferred embodiment, the input device 54 is implemented as a handheld remote control capable of transmitting infrared signals carrying commands for controlling the operation of the set-top terminal 48. The remote control can include a directional thumbpad or keypad having distinct keys for allowing the user to issue directional commands (up, down, left, right) and keys for issuing commands to control relative changes in volume or channel (increase or decrease), as well as absolute changes to channel value. The remote control and its functions are more fully described with respect to FIG. 4.

Set-Top Terminal

Figure 2:
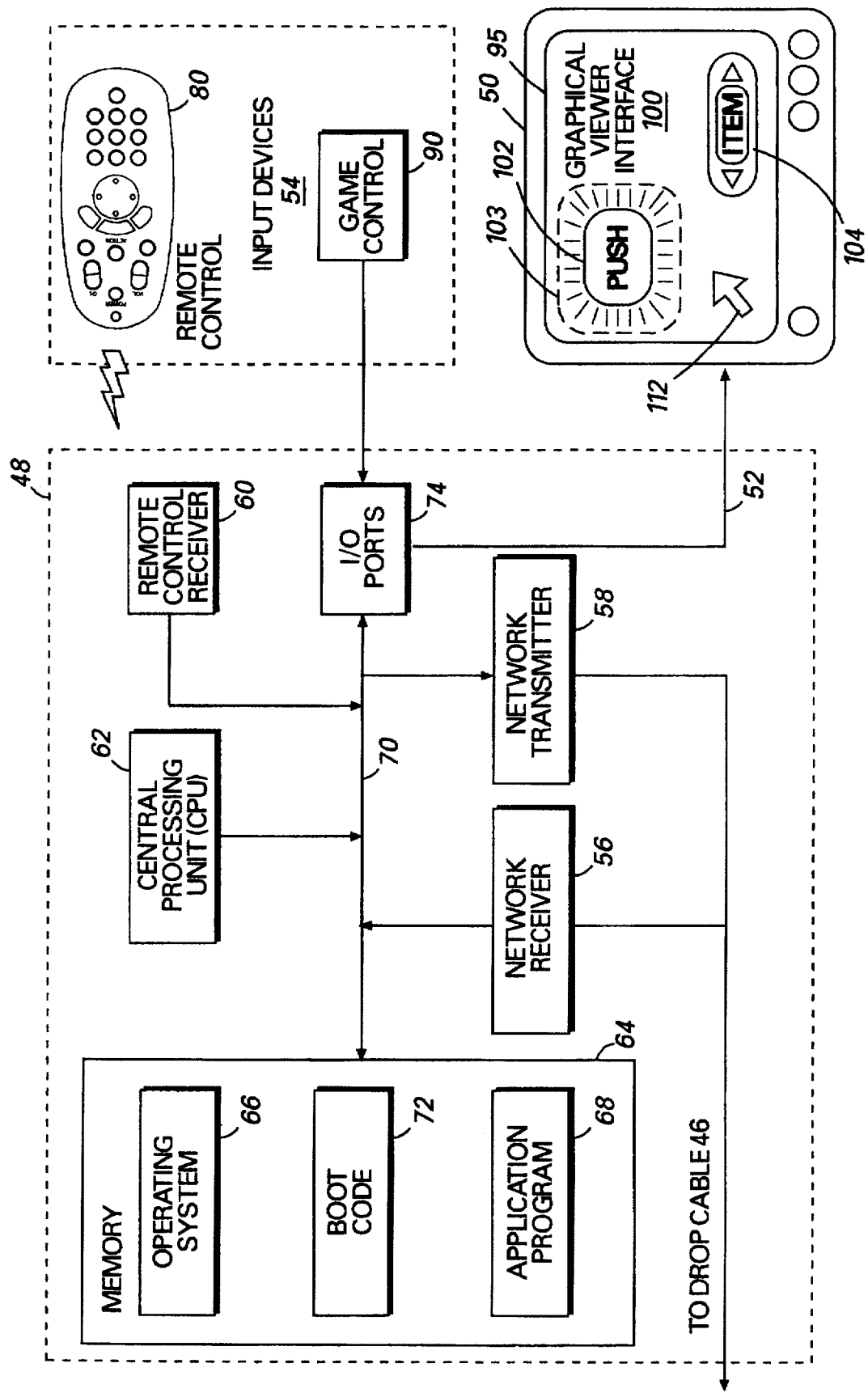
FIG. 2 is a diagram illustrating the components of a set-top terminal utilized in conjunction with the present invention.

FIG. 2 illustrate the basic components of the set-top terminal 48. The primary components for the set-top terminal 48 include a network receiver 56, a network transmitter 58, a remote control receiver 60, a central processing unit (CPU) 62, and memory 64. These components are connected by a system bus 70, which can carry control, address, and data signals.

The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television.

The network transmitter 58 transmits requests for programming information and related instructions for processing by the headend system 12.

The network receiver 56 and the network transmitter 58 are connected to the distribution network 16 via the drop cable 46.

The remote control receiver 60, which is preferably implemented as an infrared receiving device, decodes signals carrying the commands issued by the input device 54, such as a remote control unit 80.

The CPU 62, which is connected to the network receiver and transmitter 56 and 58, as well as to the remote control receiver 60, controls the operations of the set-top terminal 48 and supports the rendering of graphical images of the user interface. The CPU 62 is typically implemented by at least one single chip processor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more single-chip microprocessors to support the presentation of a graphics-intensive user interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM). The memory 64 also can include a mass storage data device, such as a hard disk drive or a compact disk (CD-ROM) drive.

The operating system 66 comprises a set of computer programs that control the internal functions of the set-top terminal 48 and support the execution of other program modules, including an application program 68. The preferred operating system 66 supports a graphics-based presentation of program-related information, including control items that visually represent control functions of the operating system and other program modules. As previously defined, a control item is a visual image that can be manipulated by the user to perform an operation supported by the underlying control object associated with this control item. The operating system 66 (and application programs 68) can receive and interpret input data supplied by the input device 54, as received by the remote control receiver 61). As will be described in more detail below with respect to FIG. 4, a user can "select" and "launch" control items by the use of the input device 54.

For the preferred set-top terminal 48, the memory 64 includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies upon data storage mechanisms located at the headend system 12 rather than within the set-top terminal 48 itself.

The set-top terminal 48 can be connected to a peripheral device via input/output (I/O) ports 74. The I/O ports 74 supports the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

It will be appreciated that the remote control 80 is not intended for high-action game use; instead, its general purpose is single-viewer, day-to-day usage. For games, a game control 90, such as wired or wireless game controllers, is supported by the set-top terminal 48. Other types of input devices 54 supported by the preferred embodiment can include a mouse and a keyboard. For example, a keyboard can be used to support electronic mail, text-based searching, and other character-based applications.

Still referring to FIG. 2, the user typically observes the preferred output device 50, specifically a display screen 95 of a television set or a monitor, to receive and to control the programming information of the interactive network system 10. The user interface for the interactive network system 10 is preferably implemented as a graphical viewer interface (GVI) 100 displayed on the display screen 95. A viewer can manipulate items displayed by the graphical viewer interface 100, such as control and focus items, by transmitting commands to the set-top terminal 48 via the input device 54, preferably the handheld remote control 80. For example, the GVI 100 in FIG. 2 shows an exemplary control item 102, a button containing the legend "PUSH ME!".

A cursor 112, which is an on-screen graphical pointer used to show the viewer where the viewer is pointing, can also be displayed for certain applications by the graphical viewer interface 100. The cursor is preferably larger than a cursor in a conventional computer environment, supports multiple colors, and can have an animated appearance. Audio elements (of course, not visible in FIG. 2) may also be used in association with the graphical viewer interface 100.

The set-top terminal 48 preferably supports the following graphics modes: 24 bit, 24 bit with 8 bits of alpha (transparency values), 8 bit palettized, 8 bits with alpha, and 16 bit (lower priority). The default palette consists of NTSC-safe halftone colors. Graphic modes can be mixed on the same screen (24 and 8 bit). In the preferred embodiment, there are 256 levels of transparency (alpha) that can be defined per pixel in the alpha modes. A control object or focus object can use any of the specified modes for bitmaps that they can contain, with one mode per sprite (display region). In 8-bit palettized mode, there is a single halftone palette that is compatible with the NTSC display. This eliminates palette flashing problems and improves performance.

A set of default fonts can be supported by the interactive graphical viewer interface 100. The preferred fonts are TRUETYPE™ brand fonts to allow for maximum flexibility. The set-top terminal 48 also can download additional fonts from the headend system 12 if needed for the operating system 66 or an application program 68. Hardware filtering (not shown) can be applied to smooth font edges for better readability of the graphical viewer interface 100 by a viewer. Alpha channel blending can be optionally available as an additional smoothening option. It will be appreciated that these font requirements are driven by the needs of the program modules and the amount of available storage for the set-top terminal 48.

The set-top terminal 48 preferably supports three digital and one analog stream of video. The digital streams can be any division of a screen having a resolution of 640 by 480 dpi. Video information can be presented on the display screen 95 in layers. For example, an audio/video (A/V) control item can be displayed in a single layer, with other video or graphics presented on other layers, either above or below the control item layer. To support animation, all A/V elements are preferably displayed at rates of 30 frames per second (fps) or faster.

The set-top terminal 48 preferably supports at least one analog steam and one digital stream of stereo audio. These audio streams can be mixed together and synchronized. Digital audio formats can include a variety of audio formats, including but not limited to MPEG, WAV, and MIDI conventions.

The set-top terminal 48 preferably also supports standard television effects for transitions that can be applied to any control item or its contents. Exciting television effects such as wipes, dissolves, tumbles, and fly-togethers are supported for both video and graphics. As described in greater detail below, the present invention allows and facilitates construction of control items that can execute features such as wipes, dissolves, tumbles, fly-togethers, etc.

Viewer Navigation

Still referring to FIG. 2, generally, when a user first powers-up a set-top terminal 48, the terminal contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as the remote control 80. In this stand-by mode, the set-top terminal 48 can communicate with the headend system 12 and can respond to administrative requests transmitted by the headend system. In the event that an user tunes to an interactive channel (typically by pressing the appropriate function key of the remote control), the set-top terminal 48 changes modes and enters the active mode. In the active mode, the set-top terminal 48 communicates with the headend system 12 to process the instructions transmitted by the remote control 80. For example, the set-top terminal 48 responds to a command requesting programming information by forwarding this instruction to the headend system 12 via the drop cable 46 and the distribution network 16. The headend system 12 responds by retrieving selected programming information from the headend servers 20 and transmitting the selected programming information via the return path provided by the distribution network 16 and the drop cable 46. The set-top terminal 48 then supplies this programming information in the proper format for presentation via the graphical viewer interface 100 on the display screen 95.

Figure 3:
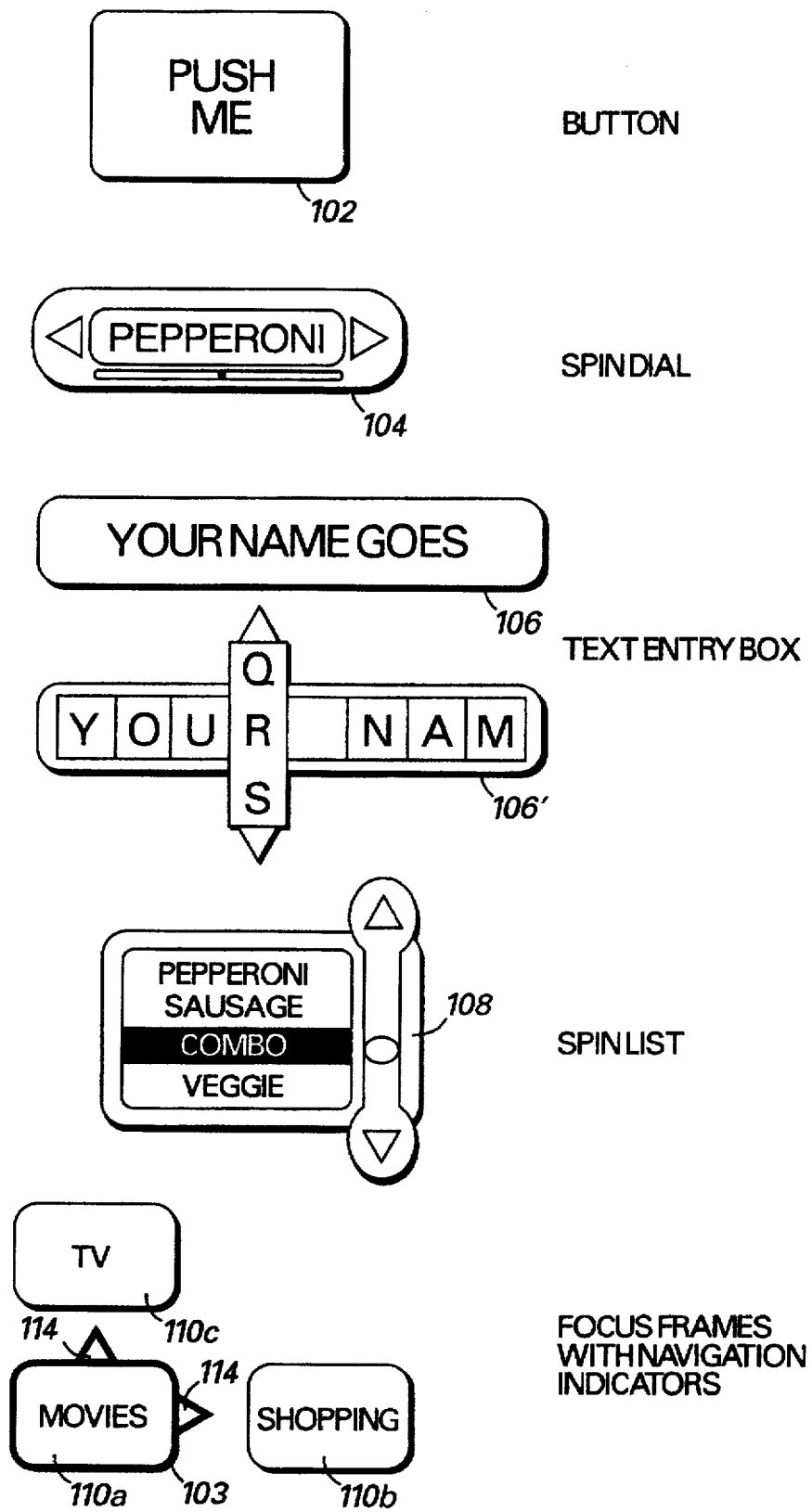
FIG. 3 illustrates several exemplary control items constructed in accordance with the preferred embodiment of the present invention.

In response to the operation of the set-top terminal 48 to receive programming information from the headend, the user (or viewer) may be presented via the graphical viewer interface 100 with one or more control items, such as control items 102, 104, 106, 108, 110 shown in FIG. 3.

The control items 102, 104, 106, 108, and 110—all different exemplary forms of control items—are typically presented as visual items displayed by the visual user interface 100. Typical control items can include:

a button for executing a command such as a push button 102 for executing a single specific command;

a "spin dial" 104 for allowing selection of an item from amongst a list of choices that can be "spun" into view by actuating sub-control elements (arrows);

a text entry box, shown in an initial state 106 and an edit state 106', that displays a small amount of text such as a user name and can be activated to allow editing;

a "spin list" 108 for allowing selection of an item from amongst a list of choices that can be scrolled by the viewer; and a series of buttons 110 with navigation indicators 114 that inform the viewer which near-by control item will be activated or reached upon activation of an appropriate button on the thumbpad of the remote control.

It will be understood that the control items shown in FIG. 3 are only examples, and other types of control objects and control items can be constructed utilizing the teachings of the present invention.

Control items can be of various types, e.g. modal, non-modal, mated, static, dynamic, etc. For example, non-modal controls—such as buttons—typically execute a single action, whereas modal controls—such as spin dials and spin lists—have an internal selection that can be changed by the viewer. Control items can vary in size and shape and can have an animated visual appearance. Indeed, the size, shape, and animated appearance of control items can be custom-designed for use in a particular operating environment. For the preferred embodiment, a "tool box" of standard of control items is provided as a part of the operating system 66 for use by application developers.

It will be understood that efficient operation of the interactive network system 10 necessarily requires the viewer to understand which control function will be acted upon when the viewer causes an action command to be transmitted by the remote control 80. For the environment of interactive television services, a control item that receives "focus" has been "selected" and, accordingly, the control function associated with this control item can be accessed and manipulated by the user. Focus is commonly presented to the user as a visual indicator indicating (a) that a control item is enabled and ready to receive a command, or (b) which one of a plurality of control items is selected by the user. Focus may be indicated by altering the view of the selected control item, or by associating a separate focus item proximate to or substantially with the selected control item. A focus item can be animated by a color or luminance change, size change, or other visual or audio component. It will be appreciated that animating the focus greatly increases the visibility. For purposes of the discussion below, focus is preferably indicated by placing a separate focus item proximate to the location of the selected control item.

Once a control item is selected, the viewer can then act on the underlying control function represented by that control item. For example, if the control item is a button, such as the button 102 shown in FIG. 3, a viewer of the graphical viewer interface 100 can cause the execution of the control function associated with this "non-modal"-type of control by inputting a command, such as an "action" command, via the remote control 80.

In contrast, if the control item presents a list of available actions or control functions, the viewer can manipulate the contents of the control item after selection of this control item. Once this "modal"-type of control item displays the desired control function, the viewer can then execute this selection by inputting a command via the remote control 80.

A focus item, which is represented in FIG. 2 by a focus indicator 103 located proximate to control item 102, is shown as a "focus ring" or "focus frame". In this example, the focus item 103 comprises a number of flashing "rays" that emanate from the button 102. By placing the focus indicator 103 proximate to the control item 102, the control operation associated with this selected control item is enabled for operation by the user. The user's selection of the control item 102 is highlighted by this placement of the focus indicator 103 around the perimeter of control item 102, and animating the focus item by causing the "rays" to flash on and off.

For some applications, such as the pushbutton 102 in FIG. 3, it is desirable that the focus indicator 103 take on a shape similar to the selected control item, and therefore appears as a square frame or ring positioned adjacent to the square-shaped button of the control item 102. However, the focus indicator 103 preferably is and remains a displayed item that is separate from the control item 102. Thus, it will be appreciated that the preferred focus indicator 103 is positioned along the perimeter of the selected control item and can adapt to the contours of the selected control item.

When a control item is selected, it is executable by a subsequent predefined command signal that is not necessarily specific to the particular control item. A selected control item, in FIG. 2 represented by the combination of the control item 102 and the focus indicator 103, is said to have "focus." To indicate to the user that the selected control item has focus, a focus indicator can alter the overall appearance of a selected control item by highlighting the interior of the control item, surrounding the selected control item by a border or frame, or otherwise illuminating the control item. Thus, the user can readily tell by looking at the display 95 which one control item has the focus among a plurality of control items.

Although the exemplary focus item 103 in FIG. 2 is positioned around the perimeter and adapts to the shape of the selected control item, it will be understood that other focus items can vary in size, shape, thickness, and color, and can have an animated appearance. For example, a focus item also can be disposed around the perimeter of a selected control item, or can appear integral to the selected control item, such as a spinning or flashing control item. Thus, it will be understood that the appearance of the focus indicator 103 can be varied based upon the requirements of the specific application, and that the focus indicator is not limited to appearing as a frame along the perimeter of a selected control item, such as the control item 102.

In view of the foregoing, it will be understood that the focus indicator or item 103 supplies a visual indication of the selection of the control item 102. This visual "cue" is particularly desirable in the dynamic environment of the interactive network system 10 because the viewer of an interactive television service can be exposed to numerous forms of visual and audio programming information that change in content over a short time span.

Referring again to FIG. 2, to change the selection of control items, the user can use the remote control 80 to send command signals to the set-top terminal 48. In response to these command signals, the focus indicator 103 can be moved from its location proximate to the control item 102 to another location proximate to another control item available for selection, e.g., the control item 104. In the preferred embodiment, there are at least two methods for changing the focus of a control item—(1) using the remote control 80 or other input device to move a pointing indicator such as the cursor 112 to another control item, or (2) tabbing from one control item to another. The former operation is termed "roam mode", which indicates that the user is free to select any visible control item at random, while the latter operation is termed "tab mode", which indicates that the user moves to a related, typically adjacent control item by pressing a predetermined key on the input device 54 that causes a tabbing operation. The present invention preferably supports both modes of operation.

The tab mode is typically used with a screen layout having a relatively small number of control items. By maintaining this relatively small set of control items, the viewer will generally not be faced with the need to tab through too many control items to make the desired selection. Thus, for more complex screen layouts, another navigation mode, a "roam" mode can be provided as an alternative navigation mechanism. The roam mode uses a cursor 112 to represent a particular location on the graphical viewer interface 100. The viewer can manipulate the position of the cursor via the thumbpad control 122 on the remote control 80. In this manner, the viewer can place the cursor on or proximate to the particular control item that the viewer desires to select to receive focus. The roam mode can be useful for applications in which the viewer has the option of choosing from a variety of displayed items that may not necessarily appear as discrete items.

For navigation in the roam mode, each control item can have an unseen "focus zone" or "gravity zone" around it, which makes it easier to select a control item when roaming. If the cursor is moved inside the defined boundaries of a focus zone, then the associated control item is automatically selected. The focus zone can be made any size or turned off if desired. When roaming, the cursor can constrained to the visible area of the screen to preventing a viewer from "roaming" off the screen.

FIG. 3 illustrates exemplary control items 110a, 110b, 110c that may be displayed to implement a tab mode of operation. A focus indicator 103 is indicated in FIG. 3 as bold outlining around the control item 110a. In the tab mode, a visual indication of each direction that the focus indicator 103 can be moved for selecting another available control item is provided by one or more navigation indicators 114. This combination of the focus indicator 103 and the navigation indicators 114 communicates simultaneously that a single control item 110a has been selected, but that other control items 110b, 110c of the graphical viewer interface 100 are available for potential selection in response to a user action.

By issuing a command signal containing a directional command, in a direction as suggested by the navigation indicators 114, the user can change the selection of control items. In the example presented by FIG. 3, the navigation indicator 114 presents visual cues that the focus indicator 103 can be moved from the control item 110a to one of the two remaining control items control items 110b, 110c. Thus, the respective control functions represented by the control items 110b, 110c are potentially available for subsequent use while the control item 110a remains selected. The locations of both the selected control item and other control items available for selection are monitored during the operation of a program module. This monitoring operation allows a determination of the possible directions that a user can move the focus indicator 103 to an available control item. In turn, these possible directions can be supplied as visual cues to the user by the navigation indicator 114.

Remote Control Unit

Figure 4:
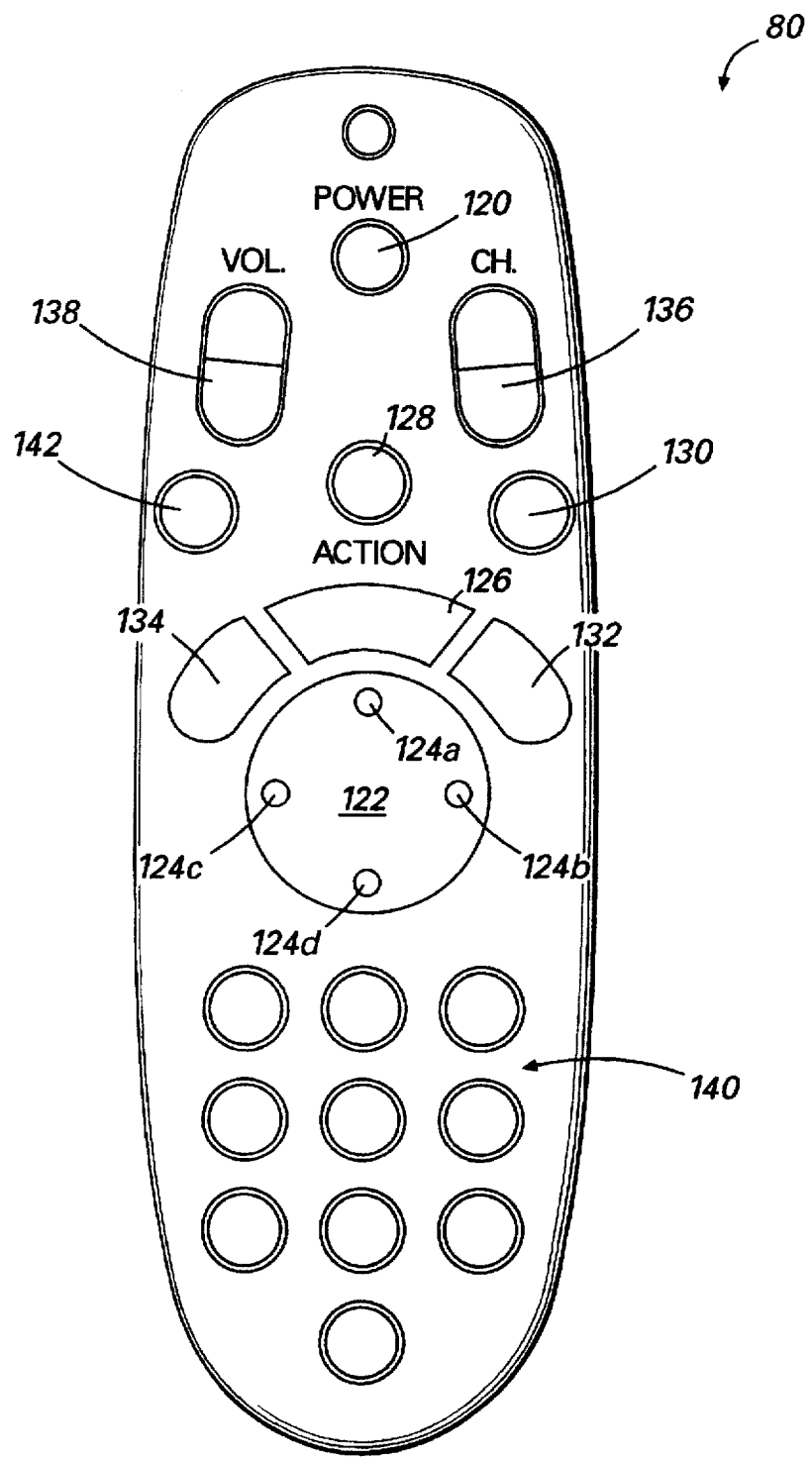
FIG. 4 is a front elevational view of an input device for controlling the operation of the preferred embodiment of the present invention.

To change the selection of control items presented by the graphical viewer interface 100, as well as to operate the control functions represented by control items, the user can use the remote control 80 to send command signals to the set-top terminal 48 via an infrared communications link. FIG. 4 shows a front view of a preferred input device for the interactive network system 10, the remote control 80. Referring now to FIGS. 2, 3, and 4, a viewer can manipulate the graphical viewer interface 100 by using the input device to make and communicate selections to the interactive network system 10. The primary input device is the remote control 80, which is the viewer's physical interface to the services offered by the interactive network system 10. The top face section of the remote control 80 includes numerous keys or buttons that allow the user to input commands for controlling functions of the set-top terminal 48 and/or the output device 50.

For example, the preferred remote control 80 includes keys that are specifically related to preferred interactive system. A thumbpad 122, also described as a directional keypad, can be manipulated by a viewer's thumb used to maneuver a pointer, such as a cursor, or a focus item, around the graphical viewer interface 100. The thumbpad 122 includes navigation keys 124a–d for inputting directional commands. The thumbpad 122 is preferably implemented as a rocker-type switch which can operated in at least four distinct positions, as represented by the navigation keys 124a–d. Each navigation key 124a–d represents a navigation direction along the primary compass points. Upon depressing the one of the navigation keys 124a–d, the remote control 80 sends a directional command containing an instruction to move a cursor or a focus item from its present position on the graphical user interface 100 to a desired position consistent with the direction represented by the selected navigation key.

For example, to move the focus indicator 103 shown in FIG. 3 (in the tab mode) from the control item 110a to the control item 110b, the right-hand navigation key 124b should be depressed to enable the remote control 80 to issue the appropriate directional command. Likewise, to move the focus indicator 103 shown in FIG. 2 (in the roam mode) from the control item 102 to the control item 104, the navigation keys 124 are depressed to cause the cursor 112 to move from its present location to the control item 104.

In view of the foregoing, it will be appreciated that the preferred interface for "navigating" among items displayed on the graphical user interface 100, such as a cursor or a focus item, is the thumbpad 122. The basic requirement of this navigation interface is to give the viewer the ability to roam to a control item in the roam mode, or jump or "tab" between control items in the tab mode. Thus, the thumbpad 122 allows a viewer to "roam" a cursor or pointer around the graphical viewer interface 100 in a manner that can be readily understood by the viewer. To support roaming or scrolling activities, the thumbpad 122 preferably has a force-sensing capability which can be used to scroll through a list quickly or slowly depending on the amount of pressure placed on the thumbpad.

Still referring to FIG. 4, an action key 126 can be used to input a command that executes or "launches" the control function represented by a selected control item. Keys 128 and 130 can activate program module-defined functions, such as specific options provided in the context of a selected program module. A menu key 132 can be used to open and close on-screen menus, and can support the viewing of a menu-like program guide containing program selections. A help key 134 displays context-sensitive information to aid the viewer's operation of the set-top terminal 48 and the program modules supported by the interactive network system 10.

The remote control unit 80 also includes a variety of keys or buttons that are common to remote control units for use with conventional television sets. These include a power key 120, a channel selector key 136, a volume selector key 138, a 10-digit numeric keypad 140, and a mute key 142. The power key 120 can be used to control the operating state of the output device 50 and the set-top terminal 48 by controlling the distribution of electrical power to these units. The channel selector key 136 allows the user to vary the channel selection of the set-top terminal 48. The volume selector key 138 allows the user to increase or to decrease the volume level of the output device 50. The numeric pad 140 includes number keys for inputting the digits 0–9. The mute key 142 can be used by the viewer to turn-off the audio of a program module presented by the output device 50.

Additional control functions can also be supported by the preferred remote control 80, such as a TV/VCR switch, a "jump to last channel" switch, and "transport controls" including play, stop, pause, fast forward, and rewind. Thus, it will be understood that the control functions supported by the remote control 80 are application dependent and, consequently, this input device is not limited to the control functions and associated commands described with respect to FIG. 4.

Construction of Example Control Item

Figure 6:
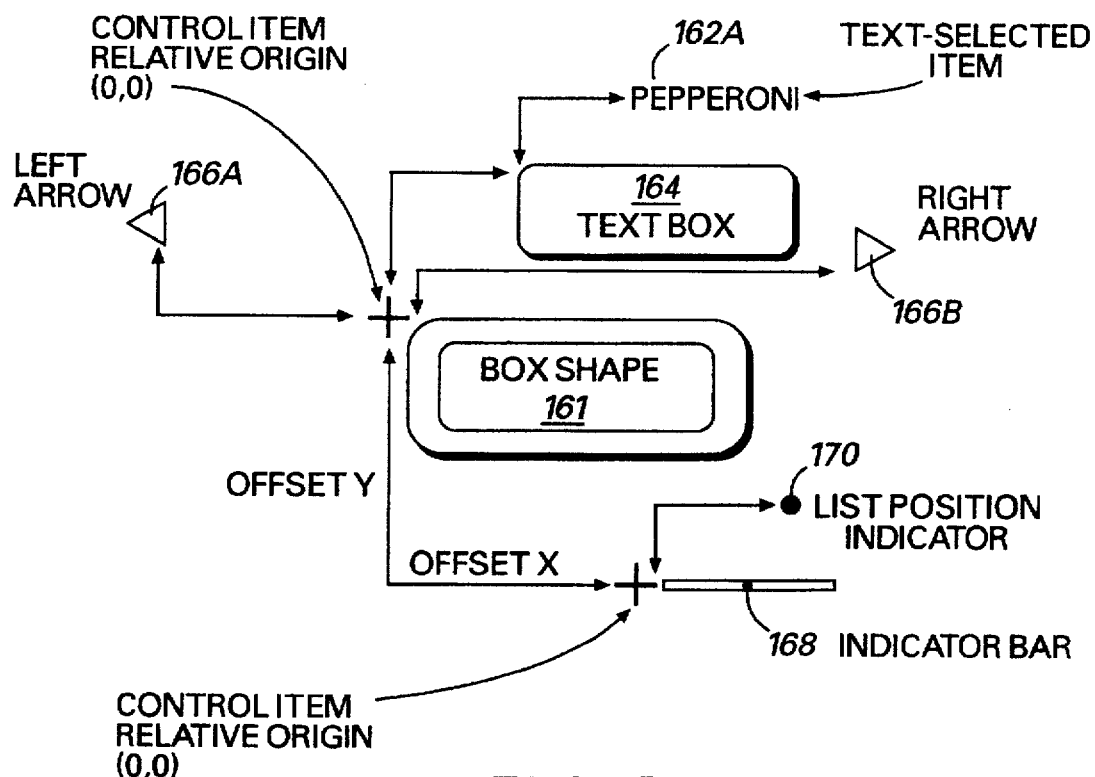
FIG. 6 is a diagram illustrating various control elements used to construct the exemplary "spin dial" type control item of FIG. 5, and the parent/child relationship of certain of the elements.

Turning to FIGS. 5 & 6, next will be described an exemplary control item such as a spin dial 104, its manner of operation, and its construction utilizing the principles of the present invention. FIG. 5 illustrates an exemplary spin dial 104 that may be presented by the graphical viewer interface 100. The spin dial 102 is a type of control item having various control functions, constructed with a number of subsidiary or child control objects and control items that are assembled and displayed on the display screen.

Intuitively, the spin dial 104 represents the metaphor of an imaginary spinning dial (such as the spinning disk 160 shown in dotted lines) that includes a number of text elements 162a–162f. The text element 162a, "Pepperoni", is visible in a text box 164 positioned centrally of a box shape 161. A left arrow 166a and a right arrow 166b are positioned adjacent the text box 164 and serve as spin controls. An indicator bar 168 is positioned beneath the text box 164, and includes a list position indicator 170 that shows the relative position of the text item 162a with respect to a list of several text items, e.g., "Cheese" 162b, "Hamburger" 162c, etc.

In execution, the user only sees the spin dial control item 104, but the illusion is created of the existence of an imaginary spinning dial represented by the dial 160. By placing the cursor 112 on the left arrow 166a or right arrow 166b and pressing the action button 126 (in the roam mode), or hitting the left-hand navigation key 124a or right-hand navigation key 124b (in either the roam mode or the tab mode), the imaginary disk 160 is caused to "spin", bringing another text element, such as the text element 162b or 162c, depending upon direction, into position in view in the text box 164. For example, if the text element 162a is "Pepperoni", hitting the arrow 166a causes the item "Hamburger" to rotate into view, while hitting the arrow 166c causes the item "Cheese" to rotate into view. As the text rotates into position, the list position indicator 170 slides along the indicator bar 168 to show the relative position of the new term relative to the remaining terms in the list.

In accordance with the present invention, control items such as the spin dial 104 are constructed in an object-oriented framework by assembling various control elements and displaying them at run time, as a function of programming. The control elements are assembled as a function of their relative relationship to other control elements, represented by underlying control objects and displayed as individually controllable sprites by a Sprite Manager program module, to be described. Thus, control items can be customized in accordance with the present invention by specifying pre-defined parameters such as text and background colors, and by adding custom design elements such as animation or sound with respect to various control objects.

Hierarchy of Control Objects

As previously described, control objects represented by displayed control items such as the spin dial 104 represent control functions through which a viewer can implement control choices. The control objects are preferably implemented as container objects containing one or more control elements such as those shown in FIG. 6. Certain control objects include standard features supported by the operating system 66, whereas other control objects are supplied by an application program 68 because they may have custom features for supporting the context of the associated application. Indeed, as with focus items, the appearance and content of control items representing control objects can vary based upon the application content.

The preferred graphical viewer interface 100 has an object hierarchy. As the terms are used herein, a "parent" is a container object that holds one or more other objects. A "child" is an object contained within another. Child objects, in turn, may also contain objects, which contain other children. Thus, any object can be "contained" by an object in the object-based hierarchy. To participate as a container, objects must support the container interface. Objects that are not containers can only be contained as a final leaf in the hierarchy tree. In general, the ability to work with and operate upon objects that are not containers will depend on their interfaces being known by a parent object. If an object that is not a container is added to the hierarchy, it is stored and released upon release of the parent object.

A top level in the hierarchy is called a "frame". Frames are not associated with, and do not have, a parent. Except for parentless top-level frames, each object in the hierarchy has one and only one parent. But each object can contain multiple children. The hierarchical tree of objects is distributed, that is, it is maintained by the objects themselves. An object serving as a container maintains a list of pointers to its child objects in display order, referred to as the "relative Z order". In addition, every contained object also stores a pointer to its parent object's interface. Thus, given an interface pointer on any object, the object hierarchy can be traversed in either direction (up or down) by either the operating system 66 or an application program 68.

Although control elements are objects in their own right, control elements and focus elements may also be thought of as building blocks for more complex control and focus objects, to cause the display of more complex control items and focus items. Those skilled in the art will appreciate that control elements, as standard objects with predefined properties, can be used to build more complex objects based upon the inherent containership principles of object-oriented programming techniques. Compound objects can be used and contained in the same fashion as simple ones. Control elements not only supply the visual components of control and focus objects, but can only be crafted to provide other effects, such as animation, sound, or data handling. With this approach, object functionality is augmented by adding an object, or in some cases an element, to a container object. This provides a flexibility of altering a standard object's appearance by substituting custom or non-standard objects in the place of the standard ones.

The following Table I lists various parameters that are stored for each control object used in the construction of a control item in accordance with the present invention:

TABLE I

| Control Object | Z order (relative to parent) |
| --- | --- |
| | OFFSET X, OFFSET Y (relative to parent) |
| | *Parent (pointer to parent) |
| | *Child(1) (pointer to child object 1) |
| | *Child(2) (pointer to child object 2) |
| | . |
| | . |
| | *Child(n) (pointer to nth child object) (in relative Z order) |
| | Properties(visible, shadowing, redraw, state, color, border) |

TABLE I-continued

DibINForHeader(width, height, bits per pixel) - header for each DIB supported by this object
ScaleFactor(horizontal, vertical)
Alpha(value) - transparency (0-255)
Filter(flag)
StateFlags(0=disabled, 1=enabled; 0=selected, 1=pushed)
*StateViewPointer(pointer to array of DIBs of state views)
SpriteFlag(1=mapped to a sprite, 0=shares surface with parent)
ElemX(1) - control element 1 associated with this object
ElemX(2) - control element 2 associated with this object
.
.
.
ElemX(n) - control element n associated with this object The data members of the control object shown in Table I provide the requisite information required for constructing a control item. It will be recalled from the earlier discussion that a control item may consist of a collection of control items represented by subsidiary or child control objects. Thus, the sum total of the presented control item will represent the results of the display of the top-most control object in a hierarchy of control objects displayed in the manner taught herein.

Each control object contains a number of attributes that control the characteristics of the control item associated with the control object. The Z order attribute indicates the display order of the control item represented by the control object relative to its parent. The OFFSET X, OFFSET Y attributes indicate a relative position of the control object with respect to the origin of its parent. For the topmost object in the hierarchy (a frame), this position will be relative to the origin of the display screen. For child objects, the position will be relative to the origin of the parent object.

The *Parent is a pointer to single parent object.

The pointers *Child(1), *Child(2), ... *Child(n) comprise an array of pointers to n child objects associated with this particular control object. The pointers to child objects are maintained in relative Z order of the child objects. This permits the assembly of a master Z list that is assembled by the Sprite Manager, discussed in greater detail below, to allow the appropriate display order of control items.

The Properties attribute stores information about the control item such as shadowing, visibility, redraw, state, color, border, and the like. These properties are typically visual properties.

The DibINForHeader attribute stores information about the width and height (in pixels) and pixel format (number of bits per pixel) for each DIB (device independent bitmap) associated with the control object.

The ScaleFactor attribute stores a scaling value that allows the control item to be resized.

The Alpha attribute stores a transparency value for this control object, ranging between 0 (fully transparent) and 255 (fully opaque).

The Filter is a flag indicates whether the control object is subject to filtering.

The StateFlags (enable/disabled, selected/pushed) are two bits of state values that indicate a state of a control object.

The StateViewPointer is a pointer to an array of state views associates with this control object. These state views will be described in greater detail below.

The SpriteFlag indicates that the object's control elements are mapped to its own sprite, or whether the object's control elements share a surface with a parent's sprite.

The ElemX(n) attribute is an array of one or more control elements associated with this object, e.g. ElemA/V, ElemShape, ElemText, etc. Greater detail concerning various types of control elements that may be associated with a control object in preferred embodiments of the present invention is provided below.

FIG. 6 illustrates how the exemplary spin dial control item 104 associated with a spin dial control object 180 is assembled from the control elements of various child objects. FIG. 7 is a hierarchical tree illustrating the relationship between the various child objects that form the spin dial control item 104 of the spin dial control object 180. When considering FIGS. 6 and 7, it should be kept in the mind that the control items (shown in FIG. 6) are not the same as control objects (shown in FIG. 7). Rather, the control items are the result of the interaction and relationship between various control objects, which store bitmaps of control elements associated with the control object, as well as relationship information to other control objects with their control item bitmaps. The resultant control item—in this case a spin dial 104—is produced by causing the spin dial control object 180 (FIG. 7) to respond to a "draw" command.

Turning now to FIGS. 6 and 7, the exemplary spin dial 104 is a control item that is represented by a Spin Dial Control Object 180 containing two basic child objects—a Box Shape Object 182 and a Focus Object 184. The Box Shape Object 182, in addition to containing a DIB control element comprising the generally rounded corner rectangular shape, contains pointers to four child objects—a Left Arrow Object 186, a Right Arrow Object 187, a Text Box Object 188, and an Indicator Bar object 189. The Left Arrow Object 186 and Right Arrow Object 187 contain control elements 166a, 166b comprising generally triangular geometric shapes, but contain no child objects in turn. Thus, the Left Arrow Object and Right Arrow Object are the "end of the line", or leaves of the tree.

On the other hand, the Text Box Object 188 contains a List Object 191, which in turn contains a Text-Selected Item Object 192.

The Indicator Bar Object 189, which is a child of the Box Shape Object 182, in turn contains a child object, a List Position Indicator Object 194. The Text-Selected Item Object 192 and List Position Indicator Object 194 are leaves of the hierarchical tree.

Also shown in FIG. 7 is a number of other information that is utilized in generating the spin dial control item 104 by way of the Spin Dial Control Object 180. To the left hand side of each object shown in the hierarchical tree is a number that indicates Z ordering of the objects in the tree, plus an indicator as to whether the particular object is mapped to a sprite (indicated with M), or shares a sprite surface with a parent object (indicated with S). The values of M and S correspond to the values of the SpriteFlag attribute of Table I, where 1=M=mapped to a sprite, and 0=S=share the parent's sprite surface. All visible elements are rendered onto a sprite's drawing surface (a "DIB" or "device independent bitmap"). The overall display of a control item is then the collection of all active sprites that comprise a control object, made visible with specified layering determined by the Z ordering by the Sprite Manager, and underlying hardware or system components.

When creating visible control items, a person utilizing the present invention has the choice of rendering a control object in its own sprite or as a component of another sprite owned by its parent, grandparent, or some higher level ancestor. When an object with an assigned sprite contains objects that do not have their own sprites, those contained objects draw themselves into that parent's sprite surface. Thus, those objects that contain the SpriteFlag=M are associated with an independent sprite, which can be separately manipulated and displayed by the Sprite Manager, while those indicated with SpriteFlag=S are rendered into a DIB forming a part of a sprite that is manipulated by the Sprite Manager at that level. Thus, an individual object draws itself onto a sprite's associated drawing surface. Access to the DIB pixel buffer, which allows direct changes to the pixels in memory of the DIB is provided.

When drawing or rendering objects in the hierarchy, each successive object is drawn (into the same DIB if shared) in descending hierarchical order, highest Z number first (that is, back to front as viewed on the screen), until the last child is encountered. When an object that owns its own sprite (SpriteFlag=M) is encountered, it starts a new drawing surface for itself and all of its child objects that do not have their own sprites.

As an aside, because certain television sets do not display all of the potential screen area on a set-top box the resolution of 640×480 pixels, the scaling property can be utilized so that a frame and all of its children are scaled down to the video safe area (640×480 scaled down to 576 by 432), or the text safe area (640×480 scaled down to 512 by 384). It will be appreciated that an application program module can still move a frame off-screen by setting negative coordinates, or coordinates larger than 640×480. However, when the position or extent is set to values within the expected visible range, preferably the control is positioned automatically such that it is within the selected safe area or region.

Still referring to FIG. 7, the spin dial body, represented by the Box Shape Object 182, as well as the Left Arrow Object 186 and Right Arrow Object 187, are each assigned their own sprites. On the other hand, the List Object 191 and the Text-Selected Item Object 192, including the contained text, shares the sprite of the Text Box Object 188. If, on the other hand, the Text-Selected Item Object 192 is to be independently manipulated relative to the Text Box Object 188 (as will be described in connection with an example below), then the Text-Selected Item Object 192 would be mapped to its own sprite. If the Text-Selected Item Object 192 shares a surface with the Text Box Object 188, then manipulation of the Text Box Object 188 and/or any of its properties are inherited by its child object, in this case, the Text-Selected Item Object 192.

In general, separate sprites for child objects should be used when it is desirable for control items to be animated quickly relative to their parent. Similarly, separate sprites should be used for child objects when the relative Z order of the child object contributes to an effect associated with the animation of its siblings. For example, if an object must actively pass between two other objects, each of the objects should be assigned to their own sprite.

Also, it is preferred to have a control item assigned to its own sprite if the control item should be rendered outside the boundaries of its parent's sprite region.

Once multiple objects are drawn into a single display surface of a sprite's DIB, the apparent Z order of those objects is fixed and contiguous, back to front, parent to child, sibling to sibling. After all control elements have been drawn in appropriate Z order into a sprite, the sprite image is a flat, two-dimensional plane. Moving sprites pass either entirely in front of or behind other sprites, as determined by the relative Z order of the sprites, and the aggregate of all objects rendered therein.

Another advantage of a sprite-based drawing system is in redraw. In a sprite containing multiple elements, the entire DIB is redrawn if a single element is erased or changed. Thus, any sprite should be redrawn if any changes occur to any of the children. A principle effect of the object hierarchy relates to positioning or visibility of displayed objects. The notion of direct inheritance applies between parent and child objects, regardless of whether shared drawing surfaces or independent sprites are used. For example, if a given control object contains a child object, then the child object moves in relation to the parent object when parent object is moved. Similarly, if the parent object is hidden by a change to its visibility attribute, all child objects are also hidden. Similarly, with respect to scaling, such that if the parent object is resized, all child objects are scaled appropriately. Therefore, it will be appreciated that the notion of inheritance applies to the various attributes indicated in Table I. Stated in other words, although child control objects may have their own attributes, in the case of a conflict, the attributes of the parent control object prevail.

Turn next to FIG. 8 for a discussion of an exemplary array of state views associated with the exemplary spin dial control item 104. These state views are accessed by the StateViewPointer discussed in connection with Table I. As discussed elsewhere, the Spin Dial Control Object 180 contains a pointer *StateViewPointer that points to an array of state views associated with the object. In the preferred embodiment of the present invention, there are four possible states that can be associated with any given control item associated with the control object. Those states are: disabled, enabled, selected/focused, and pushed/active.

In FIG. 8A, the Disabled state, which shows the spin dial 102 in a dimmed view, is associated with a display wherein the spin dial may be visible to the user but cannot be reached by navigation or activated. In many cases, it will be preferable to set the Properties (visible flag) for the control object such that the control item is not shown at all, or to provide a sufficiently transparent Alpha value.

In FIG. 8B, the spin dial 104 is shown in the enabled state, indicating that it can be reached by navigation and activated.

In FIG. 8C, the spin dial 104 is shown in the selected or focused stated, which results when it is reached by a tabbing from an adjacent object in the tab mode, or when the cursor is positioned within the geometric region on the display screen associated with the control item. In the selected/focused stated, any associated focus item is activated to indicate that the control item has received focus and will perform the command if the action button is pushed on the remote control.

In FIG. 8D, note that the right arrow 166b is itself shown in bold lines, indicating that the user has pressed the right thumb pad control to activate the control and cause the underlying text to "spin" in the text box 164. The resultant display is that the child text objects move when in the boundaries of the text box 164, clipped so as to remove portions that would be invisible, and animated to show motion. This is effected by a rotational text translation provided by the operation of the List Object 191 shown in FIG. 7.

Animation of Example Control Item

Figure 9A:
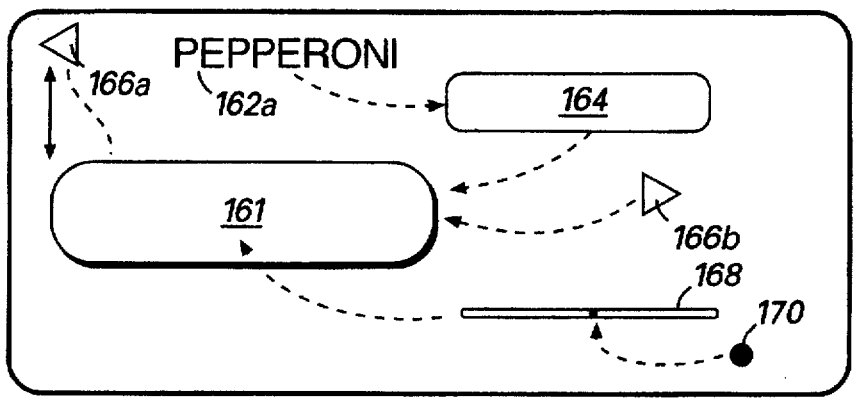

Turn next to FIG. 9A for a discussion of an exemplary animation effect that can be provided by utilizing the principles of the present invention described herein. As has been described previously, the notion of relative Z-order or layering taken in conjunction with the notion of providing separate sprites for selected control objects allows a programmer to create, animate and manipulate displayed control items in dynamic, exciting fashions, particularly suitable for use in a graphic viewer interface 100. The example of FIG. 9 relates to a "fly together" effect which can be constructed to draw a viewer's attention to the existence of the spin dial 104 as it is created dynamically on the screen.

Figure 9B:
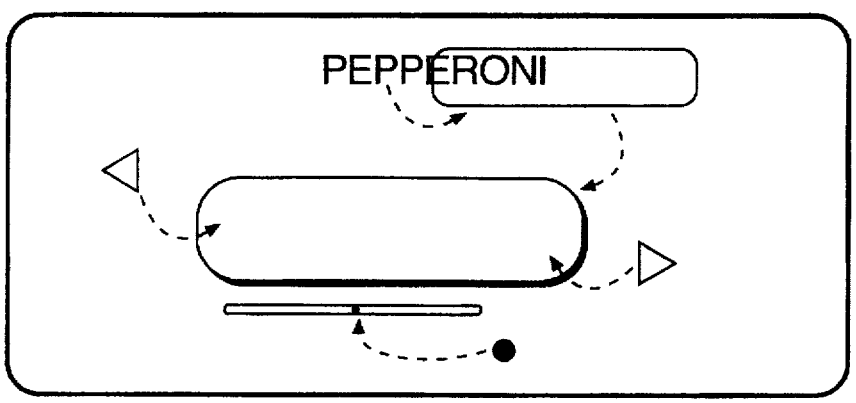
Figure 9C:
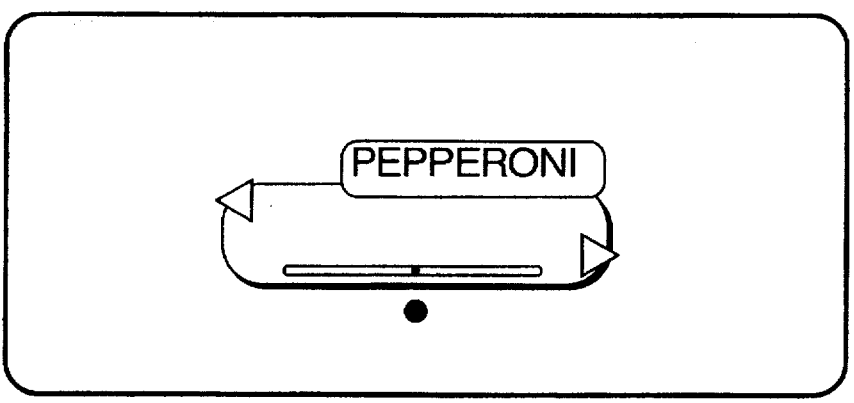
Figure 9D:
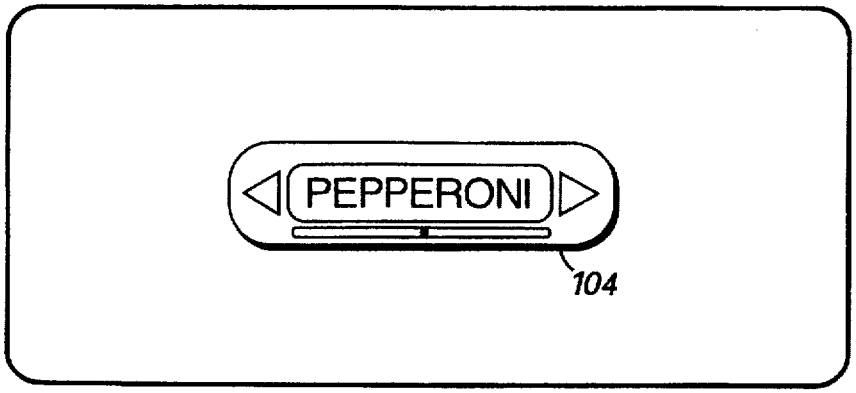

In particular, the effect shown in the sequence of FIGS. 9A–9B is the generation of the underlying child control items that dynamically "fly together" on the screen and combine to form a final, composite spin dial 104 in FIG. 9D. As described in conjunction with FIGS. 6 and 7, the hierarchical arrangement of elements is to provide the left arrow 166a, right arrow 166b, text box 164, indicator bar 168, and, in this case, text-selected item 162, with their own sprites. For each of a plurality of frames the exact number of which is determined by the programmer in accordance with a desired frame rate to cause the objects to fly together at a desired rate the control items associated with the various control objects are drawn by the Sprite Manager, with successively decreasing relative displacements until the composite spin dial control item 104 is displayed.

Thus, in FIG. 9A, the text-selected item element "Pepperoni" 162a is displaced relative to its parent, the text box 164. In turn, the text box 164 is displaced relative to the box shape 161, which in turn is positioned a predetermined initial distance away from its final resting place. In like manner, both the left arrow 166a and right arrow 166b are displaced in the x and y direction a predetermined distance relative to their parent the box shape 161. Similarly, the list position indicator 170 is displaced a predetermined distance relative to its parent, the indicator bar 168, which in turn is displaced relative to its parent, the box shape 161.

In successive frames shown in FIGS. 9B, 9C, and 9D, these relative displacements are successively decreased over a plurality of frames, until the relative displacements reach a final "settled value" that represents the appropriate spacing and arrangement of the elements of the various control objects forming a composite spin dial control item 104. After the discussion which follows in conjunction with the preferred software modules, those skilled in the art will understand how to construct software routines that generate such effects.

Set-Top Terminal Program Modules

Turning now to FIG. 10, program modules 200 running on the set-top terminal 48 box support the presentation of interactive network services to a consumer via a graphical viewer interface 100. FIG. 10 shows a block diagram of the software components of the operating system 66 that supports the presentation of the graphical viewer interface 100 by an application program 68 that runs in the set-top terminal. Referring to FIGS. 1, 2, 4, and 10, program modules 200 located within the memory 64 of the set-top terminal 48 can include program modules comprising the operating system 66 and program modules comprising one or more application programs 68. The operating system 66 can comprise numerous components, including a Remote Control driver module 204, a Focus Manager module 206, one or more Focus Object modules 208, one or more Control Object modules 210, one or more Focus Elements modules 212, one or more Control Elements modules 214, a Control Manager module 216, a 4-D Drawing Engine module 218, and a Sprite Manager module 220.

Graphical user interfaces for conventional computer systems, also described as GUI, are well known in the computer environment. However, those skilled in the art will appreciate that there are necessarily a number of differences between a conventional graphical user interface and a graphical viewer interface for the preferred interactive network system 10. For example, the preferred graphical viewer interface 100 may not include certain conventional elements of a graphical user interface for computers because they do not readily transfer to the environment of the interactive network. These conventional computer GUI elements may include: system menus, menu bars, iconized windows, an user interface for changing window size or position, window housekeeping messages, system level dialog box support, data dynamic data exchange, advanced object linking and embedding features (e.g., compound documents), a clipboard, or single-click and double-click mouse input capabilities.

In contrast, for the preferred graphical viewer interface 100, control objects and focus objects operate within the framework of an object-oriented system. Control items and focus items, which are the visual representations of the control and focus objects, respectively, are preferably designed for the interactive environment of programming services, such as television services, in both appearance and behavior. An easy-to-use remote control 80 can be used as the primary input device for issuing commands to control the functions of and inputting character-based data to the interactive network system 10. It will be appreciated that the presentation of the graphical viewer interface 100 by the output device 50, in combination with the remote control 80, provides the user with the primary tools for taking advantage of the programming information communicated by the interactive network system 10.

According to the preferred embodiment, the services available through the interactive network system 10 can be developed and maintained by use of conventional software development tools, including well known object-oriented programming mechanisms, such as interface and object conventions. As part of the operating system 66, a standard set or "tool box" of objects can be provided for use by developers of other program modules that operate in tandem with the operating system 66 to supply desired interactive network services. This set of objects is intended to be used as fundamental building blocks for the development of other program modules that operate with the operating system 66, such as the application programs 68. For example, certain standard objects, such as focus objects 208 and control objects 210, represent objects that may be programmed via interfaces. In addition, a basic set of focus elements 212 and control elements 214 can be provided by the operating system 66 to allow the construction of focus and control items, such as certain bitmaps and audio and video elements. To modify default properties, get status, or otherwise communicate with an object of the operating system 66, an application program 68 can use a pointer to a known interface and thereafter call the desired methods of that interface. This allows developers of the application programs 68 to have the flexibility to add objects or elements within new program modules of the interactive network system 10.

In the preferred embodiments of the invention, the operating system 66 is generally responsible for controlling the allocation and usage of the resources of the set-top terminal 48, such as the CPU 62, the memory 64, and peripheral devices such as the output device 50 and the input device 54. Each application program 68 is designed to support a predefined application, such as a service related to the interactive network system 10. It will be appreciated that these program modules work in tandem to support the overall operation of the set-top terminal 48 and the communication of programming information via the interactive network system 10.

The program modules 200, which can include focus objects 208 and control objects 210, as well as focus elements 212 and control elements 214, can be loaded within the memory 64 in response to the transmission of these program modules 200 from the headend system 12 to the set-top terminal 48. Specifically, the boot code 72 (FIG. 2) preferably supports the initial start-up or boot of the set-top terminal 48 by initiating a request for one or more of these program modules, such as the operating system 66. Other program modules, such as application programs 68, can be loaded in response to a specific request initiated by the viewer. Once loaded, the program modules 200 can operate to control the appearance and behavior of the graphical viewer interface 100.

The program modules 200 can include both customdesigned objects and standard objects having predefined shapes and sizes. For example, the operating system 66 can support a set of standard objects for use by the application programs 68 running on the set-top terminal 48. However, an application program 68 can manipulate these standard objects, as well as construct custom objects, to determine the overall appearance and behavior of the control and focus items displayed by the graphical viewer interface 100. An application program 68 also can set the mode of navigation for the focus item among control items, typically either tab mode or roam mode.

In the preferred embodiments, the application program modules 68 have interfaces to three primary modules of the operating system—the Focus Manager 206, one or more Focus Objects 208, and one or more Control Objects 210. A programmer creating a specific application program module will invoke these interfaces by issuing appropriate interface calls or commands at appropriate points in the program code comprising the application program; these interface calls or commands are then handled by the operating system 66 to cause the desired result to occur by the set-top terminal's resources.

Remote Control Driver

The Remote Control Driver 204 handles input signals, such as commands and character-based input data, generated by the input device 54. Specifically, the Remote Control Driver 204 supports the transfer of signals from the remote control 80 and other input devices 54, such as a keyboard (not shown) or the game control 90, to the set-top terminal 48. For example, the Remote Control Driver 204 receives a command signal containing a directional command from the remote control 80 and, in turn, sends the appropriate event to the operating system 66 for use by the Focus Manager 206. Typical input signals handled by the Remote Control Driver 204 include: (1) directional commands for moving the focus item between control item or for navigating a cursor along the graphical viewer interface, (2) action commands for initiating the execution of desired functions, (3) conventional television/VCR-related commands, and (4) character-based input data.

The Focus Manager

The Focus Manager module 206 is responsible for managing "focus" by determining which control item has been "selected" based on input signals transmitted by the input device 54 or in response to a default selection defined by a program module 202. In this manner, the Focus Manager 206, which can be implemented as a container object, supports on-screen navigation of the focus item between control items. To support these tasks, the Focus Manager 206 communicates with the application program modules 200, the Remote Control Driver 204, and any focus objects 208. For example, a program module 202 can supply the Focus Manager 206 with information defining the appearance of the focus item, and the initial location of the focus item. An program module 200 can also supply the information defining the location of control items on the graphical viewer interface 100, and whether each control item represents a modal or non-modal control function.

The Focus Manager 206 can support two separate navigation modes, the tab and roam modes. A program module 200, typically as an application program 68, selects one of these navigation modes based upon the context of the application. The desired navigation mode is typically communicated to the Focus Manager 206 by an application program 68 during a registration process. In tab mode, the Focus Manager 206 operates upon directional commands and moves the focus item in accordance with the direction contained in these commands. By default, a cursor is typically not displayed in the tab mode. However, it will be appreciated that the cursor can be used, if desired, to function as a type of focus item. In contrast, in the roam mode, the Focus Manager 206 typically moves the cursor (or a focus item) in response to the directional commands issued by the input device 54.

Control objects 210 that are to be enabled (i.e., can hold the focus) typically register with the Focus Manager 206 when they are enabled, and unregister with the Focus Manager 206 when disabled or destroyed. Typical registration information includes the location of the associated control item on the graphical viewer interface 100, and whether this control item is modal or non-modal.

Based on the registration list of eligible control objects, the Focus Manager 206 can compute which registered control object should gain focus as a result of an eligible focus change event. The Focus Manager 206 monitors the directional commands passed by the Remote Control Driver 204 and moves the focus whenever a known directional command or event is encountered. In response to a focus change event, the Focus Manager 206 first advises the previously selected control object 210 to lose focus. In turn, the Focus Manager 206 can notify the selected control object 210 that it has been assigned focus. Upon this notification, the control object 210 can register for events that it is interested in, change its appearance as appropriate, and thereafter wait for registered event notifications. In contrast, when a control object 210 loses focus, it may change its appearance and cancel any event registrations that were contracted for when it acquired focus.

Focus Object

The focus object 208 represents the focus function and is preferably implemented as a container object containing one or more focus elements 212. One or more focus objects 208 may be provided. Any focus object 208 communicates with the Focus Manager 206 and any associated control objects 210 to obtain information for supporting the rendering of a focus item. Typically, a program module 200, such as an application program 68, can supply the Focus Manager 206 with one or more focus objects 208 for use with a particular application. A focus object 208 can be visually represented by a particular focus item, such as a focus ring or frame, which conforms itself to the location and shape of the selected control item having focus. To identify the location of the selected control item, the focus object 208 can interrogate the Focus Manager 206, as well as the control object 210 represented by the selected control item.

It will be appreciated that the implementation of the focus concept as an object provides the advantage of a flexible appearance for the associated focus item. This design flexibility is gained through the containership feature inherent in object-oriented programming techniques.

Control Objects

Control objects 210 represent control functions and are the mechanisms through which a viewer can implement control choices. One or more control objects 210, constructed as described herein in accordance with the present invention, may be provided. Any control objects 210 are preferably implemented as a container object containing one or more control elements 214. Certain control objects 210 include standard features supported by the operating system 66, whereas other control objects 210 are supplied by the application programs 68 because they may have custom features for supporting the context of the associated application. Indeed, similar to focus items, the appearance and content of control items representing control objects 210 can vary based upon the application context.

The appearance of control items associated with control objects 210 can be altered to support specific applications. This can be achieved by adding child elements to these control objects. Unlike conventional computer controls, the properties of control objects 210 for the graphical viewer interface 100 are not limited to a predefined set of parameters. To add to or to enhance a control object 210 for the environment of the interactive network system 10, an application program 68 can manipulate the elements of standard objects or add the desired elements to the object. An added element can be a standard element, or it can be custom designed by an application developer. Thus, application programs for use on the set-top terminal 48 may be built, in whole or in part, by using a set of "standard" control objects, focus objects and associated elements.

As described elsewhere herein, control objects 210 typically have the following characteristics: the viewer can interact with them, they have definite states, and they can used to display information via the displayed items of the user interface. Thus, the underlying operation of a control object 210 is preferably consistent among different applications. For example, an application program 68 can the appearance of a control item representing a particular control object 210, but regardless of the application, this control object should consistently execute the function associated with this control item.

There are two types of the control objects 210: modal controls and non-modal controls. Non-modal controls, such as a button, execute a single action or function. When a non-modal control is selected, the user's action of pressing the action key 126 on the remote control 80 can execute the associated command. The thumbpad 122 on the remote control 80 is useful for issuing directional commands to change the focus selection among control items.

On the other hand, modal controls, such as a spin list or a spin dial, have an internal selection that the viewer can change by using the thumbpad 122 to issue a command signal to the set-top terminal 48. Once a modal control is selected, the modal state must be activated before the contents can be manipulated. There are several ways of placing a control object 210 into its modal state. One method is to have the viewer press the action key 126, thereby issuing a command signal having an action command that instructs the set-top terminal 48 to conduct the action operation. The other method is to have the modal state activate automatically when the control is selected (i.e., holds the focus). In this case, the viewer can move the control out of the modal state by pressing the action key 126 or by using the thumbpad 122 to navigate to another control. The method of modal activation depends on the particular application.

Manual modal activation requires an action by the viewer to place the control object into a modal state before the control can change its contents. For example, when a viewer selects a spin dial control item, the user can then press the action key 126 to move the control to the modal state. In turn, the viewer can use the thumbpad 122 to move through the list of items presented by this selected control. After choosing an item from the spin dial list, the viewer press the action key 126 again to exit the modal state. The viewer can then use the thumbpad 122 to change focus by moving the focus item between controls items. In contrast, automatic modal activation allows the viewer to change the contents of a control item without first having to press the action key 126 to switch the control object 210 into the modal state.

When a control object 210 is modal, directional commands that normally support navigation between control items are instead used to select choices offered by these modal s controls. Control objects 210 with focus may pass events that they do not "consume" to the Focus Manager 206. The control object 210 determines whether directional commands are to be consumed, and whether those that are not consumed should be passed to the Focus Manager 206.

Control Elements and Focus Elements

The focus elements 212 and control elements 214 are the building blocks that the program modules 200 can use to create control items and focus items. A particular element may serve as a control element 214 or as a focus element 212. Focus items and control items are typically built using a standard set of focus elements 212 and control elements 214.

For the preferred implementation of the graphical viewer interface 100, the frame is the primary container element with which complex focus items and control items are built. Frames are analogous to windows in a conventional computer graphical user interface, in that frames are used for displaying and containing groups of other items. Frames can contain graphic images, animation, video, text, and other standard elements, as well as other frames. Typically, the application specifies the content for a frame. Frames can be positioned in absolute screen coordinates or relative to a parent frame. For example, a focus frame may be linked to a control frame so that the focus item is always displayed in the same manner relative to the control item. Thus, if the control item is moved, the linked focus item will move with it.

Frames can contain visual elements, such as text and bitmaps, which define the appearance of the frame. Different frames can be set to different color depths on the same screen as long as they are rendered on separate sprites. A frame can contain device-independent bitmap (DIB) images in a desired color depth. A DIB can be cropped, stretched, or compressed to fill a frame, or it can be tiled to create a texture to accomplish such an effect. A frame can also be used to display characters, such as text, by adding a character element to the frame display.

For the preferred implementation of the graphical viewer interface 100, there are at least two standard types of backgrounds for frames, a single color, and a "fade" from one color to another. Frames may have a border with 3-D effects, a straight line border, or no border. Color and alpha transparency level can be set independently for each frame.

The focus objects 208 and control objects 210 have properties that determine behavior and appearance of their respective focus items and control items. Focus objects 208 and control objects 210 preferably share a container interface that includes the capability of adding objects (i.e., these objects can serve as containers). Those skilled in the art will appreciate that these objects, as distinguished from elements, include the ability to support multiple states and to source and sink events. Although elements are objects in their own right, the control elements 214 and focus elements 212 can be thought of as building blocks for focus objects 208 and control objects 210.

In view of the foregoing, it will understood that focus objects 208 and control objects 210 may be custom designed, or composed of a number of standard element objects. These standard element objects can be combined to create new items or added to existing items. For the preferred embodiment, the following description defines standard element types and a listing of their properties. Each description of an element is preceded by a name which represents a parameter that can be passed through an interface to a focus object 208 or to a control object 210. An application developer can create or augment the properties of focus items and control items by specifying these elements for the underlying focus object 208 or control object 210. Exemplary control and focus elements can include, but are not limited to:

1. ElemShape: A shape element is the basic graphical building block element for a frame. It consists of a shape type, border shadow, and background. General properties preferably include: (1) shape (rectangle, rounded rectangle, circle, quad, sphere, cube); (2) size; (3) color; and (4) position. The shape, size, color, and position can be specified either in global screen terms, inside the video safety area, or relative to a container frame.

2. ElemText: Text elements are containers for displaying text on the screen, and support the rendering of text for the items associated with focus objects 208 and control object 212. A text element preferably has the following properties: (1) font name; (2) font size; (3) font style (e.g., bold, italic); (4) underline; (5) color; (6) effects (e.g., shadow, outline); and (7) wrap. A text element can be of mixed types. For example, a single text element can contain bold and plain text. In addition, the background of a text element can be transparent, or a specified color.

ElemText can support "alpha" blending, which is a technique similar to anti-aliasing, is used to smooth-out the jagged edge appearance (the stairstep effect) of text and graphics presented by pixel-based output devices. For purposes of this discussion, alpha specifically refers to a level of transparency that is applied to a pixel. Using an alpha channel that fades the transparency at the edges of the text gives the appearance that the text is blended into the background. Pixels can be transparent (full alpha), opaque (no alpha) or somewhere in-between in this range. By giving the pixels along the edge of an image a partial alpha value, the edge appears to blend into the background and appear smoother.

3. ElemA/V: The video element supports the display of a motion video by a item associated with a focus object 208 or control object 210.

4. ElemPicture: The picture element supports the display of DIB image by a item associated with a focus object 208 or control object 210.

5. ElemList: The list element supports the management of lists of items. For example, items can be added or deleted from a spin dial, list box, grid control or text edit control via this element.

6. ElemSound: The sound element supports the assignment of a discrete sound to a control object 210 for each of its states. For example, when a button is selected, it could make a soft "click" sound, or the scrolling of a list could be accompanied by a "sliding" sound. Likewise, a focus item representing a focus object 208 can also have an assigned sound(s). It will be appreciated that audio feedback adds communicative value to the interface to help a viewer understand what is happening.

7. ElemAlign: The alignment element supports the alignment of a visual "child" item with its parent.

Control Manager

The Control Manager 216 handles the linking and layering of focus objects 208 and control objects 210. A focus object 208 may be linked to a control object 210, which then becomes a parent container holding the focus object 208. The Control Manager 216 maintains a "master" container object. Top-level frames (i.e., frames with no parent) are preferably registered with this master container object. This allows the Control Manager 216 to support the tasks of switching between various program modules 200 when more than one program module is running on the set-top terminal 48.

The Control Manager 216 can communicate with the Sprite Manager 220 to render focus items and control items respectively representing the focus objects 208 and control objects 210. Thus, the preferred graphical viewer interface 100 can be represented by a collection of active sprites, which are organized by the Control Manager 216, and displayed with specified layering by the Sprite Manager 220 and underlying hardware or system components.

Drawing Engine

Control items and focus items can be rendered by using a 3D drawing engine 218, which is preferably implemented by the use of "ACTGFX". The drawing engine 218 supports the creation of focus items and control items having a three-dimensional appearance. A program module 200 can may specify the 3-D appearance of a focus item or a control item by using a corresponding 3-D data file to describe the item's appearance. These items can be rendered as sprites to obtain high performance translation and animation capabilities and to support special visual effects.

Sprite Manager

Any focus objects 208 and control objects 210 can include or communicate with other objects to produce active animation, sound, and video support, as well as to supply advanced graphical effects, such as fades and wipes and improved video quality. It will be appreciated that the display of items associated with these objects can be achieved by the use of sprites, rather than by a frame buffer. The Sprite Manager 220 supports the rendering of visual (and audio) elements of focus items and control items. For example, each element of an item (control or focus) displayed on the screen can be assigned to a separate sprite if desired. Alternatively, control elements not having their own sprites are drawn into the sprite surface (a DIB) of an ancestor object that has a sprite.

Each sprite preferably has a defined width and height (in pixels) and a pixel type (bits per pixel format). In addition, a sprite preferably includes a display buffer and can have an independent pixel format (e.g., 8 bits per pixel palettized, or 24 bits per pixel with 8 bits alpha for fading). A display buffer can be matched to the specified item size and pixel type. Scale factors (horizontal and vertical) can be used to support the resizing of an item for fast zoom effects.

Sprites controlled by the Sprite Manager 220 have a relative Z order, or layering, which is effectively controlled by the Sprite Manager. When added as a child, an object is typically layered in front of its parent. A given object can be inserted or moved to just before or after a specified sibling object, or on top or bottom of all siblings, by changing the relative Z order. Thus, this approach implies that an object cannot be behind its parent nor in front of any of its siblings. A sprite can be shared by more than one focus object 208 or control object 210. When objects have their relative Z order changed, all of their children preferably are assigned to the new layer, such that the relative position of the children is invariant. In this event, the Sprite Manager 220 can update the relative Z order of all affected children and their sprites.

Those skilled in the art will appreciate that the effect of this object hierarchy on positioning or visibility of displayed objects is known as direct inheritance. For example, if a parent object P contains a child object C, then object C moves in relation to object P when object P is moved. If object P is hidden, its children also become hidden. Likewise, if a parent P is resized, then its children can be scaled in an appropriate fashion. However, this inherited feature can be disabled so that children can remain a constant size as their parent is resized.

The position of a sprite, which is controlled by the Control Manager 216, and defined by the relative x and y coordinates with respect to a parent object and a relative Z order, is passed to the Sprite Manager 220. Various additional properties, such as colors, borders, and additional contained elements determining an item's appearance, can also passed to the Sprite Manager 220 by the Control Manager 216.

As described in greater detail elsewhere, the Sprite Manager 220 maintains a list of active sprites by generating span lists consisting of one entry per occupied scan line per sprite. These span lists are preferably held in sorted Z order and are referenced by supporting video hardware to actually render the scan lines. Further discussion of this operation is provided in conjunction with FIG. 16.

Multiple objects can be rendered by a single sprite, and multiple sprites can be located at the same point on the screen. Relative Z order and transparency determine which sprites, and which objects within sprites, are actually visible.

Video and Audio Drivers

Still referring to FIG. 10, video display devices and audio display devices are supported by video drivers 222 and audio drivers 224. Construction of these drivers is considered within the skill of the art and does not form a part of the present invention.

Computer-Implemented Process

FIG. 11 shows a top level logical flow diagram for a computer-implemented process according to the preferred embodiments of the present invention for controlling the items displayed by the graphical viewer interface 100 for an interactive network system supporting interactive television programs. Referring now to FIG. 11, the computer-implemented process or routine begins at step 1101. At step 1101, the set-top terminal 48 is initialized upon system start-up, i.e., when the viewer powers-up the set-top terminal 48, typically by pressing the power key 120 of the remote control 80. Preferably, initialization of the set-top terminal 48 is conducted by the boot code 72, which is stored in the memory 64 and initiates a request to the headend system 12 to down-load certain program modules, such as portions of operating system 66 and a "default" application program 68.

In step 1102, the program module(s) are received by the set-top terminal 48 via the distribution network 16 and loaded into the memory 64. These program modules typically include focus objects 208 and control objects 210 that support the display of associated control and focus items by the graphical viewer interface 100 on the television screen 95. In turn, the viewer can control the operation of the set-top terminal 48 and the operation of the program modules 200 running on the set-top terminal by selecting a desired control item and executing the underlying control function represented by the selected control item.

Upon completion of loading operations, a computer-implemented routine 1200 registers the locations of any control items and focus items, and displays the control items representing any underlying control objects 210 and any focus items associated with the focus objects 208. Although the items displayed by this initial display are dependent upon the associated program module 200, it will be appreciated that this initial display can be implemented as a default version that is always presented upon initialization of the set-top terminal 48. Routine 1200 is described in more detail with respect to FIG. 12.

During the registration process of routine 1200, a program module calls the Focus Manager 206 and passes information relating to the control items and the focus item to be displayed via the graphical viewer interface 100. The positions of control items associated with enabled control objects 210 are registered with the Focus Manager 206. Likewise, the focus mode and the initial position of any focus item is preferably registered with the Focus Manager 206. In addition, the navigation mode, either roam mode or tab mode, is initially registered with the Focus Manager 206 during the routine 1200.

Control items representing enabled control objects, as well as certain control items associated with disabled control objects, can be displayed by the graphical viewer interface 100. Thus, in response to routine 1200, the graphical viewer interface 100 can present for viewing a combination of control items and focus item indicating which control item has received initial focus. A representative focus item is shown in FIG. 2 as the focus indicator 103 located proximate control item 102.

After completing this initial registration process and presenting an initial display of the graphical viewer interface 100, the set-top terminal 48 is now ready to accept a command from the input device 54. At step 1210, the system receives a command signal in response to the user's decision to conduct a desired control operation. For many control operations, the remote control 80 will be used to transmit an infrared command signal to the set-top terminal 48. The command signal generally affects the control item that currently has focus, i.e., the control item designated as having focus as a result of placing the focus item proximate to this control item.

At step 1220, an inquiry is conducted to determine whether a "modal" command signal has been received by the set-top terminal 48 from the input device 54. A command signal is treated as a modal command if the control object represented by the control item having focus is set to the modal state. If so, the "YES" branch is followed to step 1225. In step 1225, command signals containing directional commands will operate the modal state of the underlying control object 210. For example, if the control item having focus is a spin dial 104, such as the example of FIG. 6, this reception of a modal command signal will operate to "spin" the list items offered by this control. Thus, the display of this modal control item preferably changes in response to a modal command. The process then proceeds to step 1500.

In contrast, if a modal command signal has not been issued by the input device 54, then the "NO" branch is followed from step 1220 to step 1230. At step 1230, an inquiry is conducted to determine whether a "non-modal" command signal has been received by the set-top terminal 48. A command signal is treated as a non-modal command if the control object represented by the control item assigned focus is in a non-modal state. A non-modal command signal containing a directional command operates to change the focus from one control item to another. Thus, if the response to this inquiry in step 1230 is positive, then the "YES" branch is followed to routine 1300. The control item which is to receive focus is determined by routine 1300.

As will be described in more detail later, routine 1300 determines focus selection based upon whether the navigation mode is set to roam mode or tab mode. The navigation mode is initially registered with the Focus Manager 206 during the routine 1200. However, it will be appreciated that this initial registration of the navigation mode can be changed by a program module 200 running on the set-top terminal 48 or in response to an instruction downloaded to the set-top terminal 48 from the headend system 12.

For routine 1300, if the navigation mode is set to tab mode, then the focus item can tab or otherwise jump directly from one control item to another control item in response to a command signal containing directional commands. To support this transition, the list of registered control items is examined to determine the control item that currently has focus and the control item that is to receive focus, i.e., the control item available to receive focus and located in the direction supplied by the directional command. The focus item can then be moved from its current location to a location proximate to this newly selected control item.

Once the control item which is to receive focus has been determined, the computer-implemented routine 1400 updates the display of the focus item and the control items, as presented to the viewer by the graphical viewer interface 100. Routine 1400 is described in more detail below. The updated display will include a visual cue to highlight the selection of the control item having focus. After the display is updated by routine 1400, control passes to step 1240.

In step 1240, an inquiry is conducted to determine if the command signal output by the input device 54 contains an "action" command. An action command can be associated with the activation of a control function associated with the control item holding the focus. Alternatively, an action command can change the state of the control mode from a modal state to a non-modal state, or vice versa. For the remote control 80, an action command is typically transmitted in response to the user's selection of the action key 126. If an action command has been transmitted, the "YES" branch is followed to step 1245 and the action command is executed. Control then passes to step 1500. Otherwise, the "NO" branch is followed from step 1240 to step 1250.

At step 1250, an inquiry is conducted to determine whether a command signal containing an end command has been output by the input device 54. Because a "terminate" function is not assigned to a dedicated key on the preferred the remote control unit (FIG. 4), a program module 200 preferably provides the viewer with a mechanism to dismiss or to otherwise close this program. This can involve dismissing the display component for an application program that runs in the background, such as a stock quote, news filters, the program guide, and so forth. Alternatively, a viewer can discontinue the display of control items on the screen by entering a selected command or combination of command from the input device 54. Another mechanism for terminating a program module is by turning off the electrical power to the set-top terminal 48. If an end command is detected, the active program module will terminate at the "END" step; otherwise, the process follows the "NO" branch and control passes to routine 1500.

At step 1500, a display screen routine is executed. This routine, described elsewhere in connection with FIG. 15, is operative to output the top level frame, constructed as described herein in accordance with the present invention, onto the display screen 95. This entails combining any sprites handled by the Sprite Manager with any graphical images provided as an input from the network receiver 56 (FIG. 2), to create a composite image for display to the viewer. After the display screen routine has executed, control returns to step 1210 to monitor for the occurrence of another user command.

Those skilled in the art will appreciate that for as long as the computer-implemented process 1100 is running, it will continually loop through steps of FIG. 9 to receive and act upon viewer input commands and display output. Furthermore, it will be understood that a program module 200 may also, as a result of the execution of the steps shown therein, cause the display of control items and the focus item on the screen 95 to be changed at any time. New programming information loaded into the set-top terminal 48 from the headend system 12 may also change the presentation of the control items and the focus item.

FIG. 12 is a logical flow diagram that illustrates the steps for the computer-implemented routine 1200, which is responsible for the registration and display of control and focus items. At step 1201, an inquiry is conducted to determine whether an initial control object 210 operates in the enabled state. If so, the "YES" branch is followed from step 1201 to step 1203, and the position of this control object 210 is registered with the Focus Manager 206. The StateFlag (enabled/disabled) is set equal to 1 (enabled) for this object. This enabled control object 210 is then presented as a control item to the viewer by the graphical viewer interface 100 on the display screen 95 by other steps. The routine then continues to decision step 1208.

In contrast, if the initial control object 210 operates in the disabled state rather than the enabled state, the "NO" branch is followed from step 1201 to step 1205. At step 1205, the StateFlag(enabled/disabled) is set to 0 (disabled).

A determination is made in step 1206 whether to display the control item for this disabled control item. If the disabled control item is to be displayed, at the 1207 the Properties (visible) attribute for the associated control object is set to 1 (visible). If the disabled object is not to be displayed, at step 1208 the Properties(visible) attribute is set to 0 (invisible).

After setting the visibility properties from either steps 1207 or 1208, the routine then continues to decision step 1209. In decision step 1209, an inquiry is made to determine whether other control objects 210 are available and required to support the graphical viewer interface 100. If the response is positive, the "YES" branch is followed from step 1209 to step 1201 and another control item is examined to determine whether it is enabled. Otherwise, the routine continues by following the "NO" branch to step 1210. In this manner, this loop is followed until all control objects 210 required to support the graphical viewer interface 100 are examined by this routine and appropriate display attributes set.

After all of the control objects 210 have been processed in the manner described above, the focus mode is registered with the Focus Manager 206 at step 1210. Likewise, the initial position of the focus item is registered with the Focus Manager 206 at step 1212. The initial navigation mode (roam mode or tab mode) is registered with the Focus Manager 206 in step 1214. The active program module 200 typically supplies this initial navigation mode information to the Focus Manager 206.

In step 1216, the registration list is reviewed to determine whether the navigation mode is set to tab mode. If so, the "YES" branch is followed to step 1218, and an inquiry is conducted to define the control items that would be available to receive focus if the focus selection is subsequently changed. This determination is made based upon information maintained in the registration list, which defines the location of control items objects 210 to be displayed. The routine then proceeds to step 1220.

In contrast, if the answer to the inquiry in step 1216 is negative, the navigation mode is set to the roam mode, and the routine proceeds to step 1220.

In step 1220, the focus item is enabled for display by the graphical viewer interface 100 on the screen 95. In the preferred embodiment, this is effected by setting an appropriate flag in any focus object associated with the control object that has been selected to have focus.

Upon completion of routine 1200, the graphical viewer interface preferably presents control items and a single focus item identifying the control item having initial focus, as indicated by the placement of the focus item proximate to this selected control item. For example, FIG. 2 depicts the graphical viewer interface having two control items, namely control items 102, 104, and a single focus item represented by the focus indicator 103.

FIG. 13 is a logical flow diagram that illustrates the steps of the computer-implemented routine 1300, which is responsible for determining focus selection. At step 1301, an inquiry is conducted to determine whether the navigation mode is set to the roam mode. The navigation mode is preferably controlled by the active program module, such as an application program 68, and is initially registered with the Focus Manager 206 during operation of the routine 1200 (FIG. 12). If the navigation mode is set to the roam mode, the "YES" branch is followed from step 1301 to step 1302. Focus zones, which can be defined around each enabled control item, are determined in step 1302. A focus zone, which is also described as a gravity zone, is a region defined around a control item. A focus zone supports the easy navigation of a cursor or pointer onto a control item associated with the focus zone. Specifically, rather than having to locate the cursor directly over a desired control item, the focus zone shifts the focus when the user places the cursor within the focus zone that is defined around this selected control item.

At step 1303, the cursor position is determined and, in step 1304, the control item selected by the user is identified. In the roam mode, a user "selects" a control item by placing the cursor within the focus zone of the desired control item. Thus, if the focus zone is intersected by the cursor, the focus is shifted to the control item within this focus zone.

In contrast, if the response in decision step 1301 is negative, then the navigation mode is set to tab mode, and the routine follows the "NO" branch to step 1305.

In tab mode, the focus can jump directly from one control item to another control item in response to a command signal containing a directional command. This focus transition is represented by moving the focus item, such as the focus indicator 103 of FIG. 2, from the location proximate the control item that initially has focus to the location proximate the control item that is to receive focus. In view of the foregoing, in step 1305, the command signal containing the directional command is examined. Based upon this directional command, an available control item is identified. This particular control item intersects the direction associated with the directional command, and is located adjacent to the presently selected control item. In step 1306, the present location of the focus item is determined based on the registration list maintained by the Focus Manager 206. The two pieces of information gathered in steps 1305 and 1306 serve to identify the present location of the focus item and the desired location of the focus item, i.e., the location proximate to the control item intersecting the direction associated with the command signal and located next to the presently selected control item. In step 1308, the control item receiving focus is determined to support the transition of the focus item from the originally selected control item to this newly selected control item.

FIG. 14 is a logical flow diagram that illustrates the steps for updating the display of the focus item on a graphical viewer interface, as supported by the computer-implemented routine 1400. Starting at step 1410, the focus item associated with the control item currently holding the focus is discontinued. At routine 1420, the focus object 208 representing this focus item interrogates the control object 210 receiving the focus. During this interrogation, this control object 210 passes parameters to the focus object defining the position and configuration of the control item representing this control object 210. These parameters can include the location of this selected control object 210, size and shape of this selected control object, etc.

At step 1430, the focus item associated with the control item receiving the focus is enabled for display on the graphical viewer interface 100. This is effected by setting an appropriate "display enabled" bit in the focus object associated with the control object. In the example discussed in connection with FIG. 7, the focus object 184 associated with the spin dial control object 180 is enabled for display. Routines for displaying the control items and focus items associated with the control object are responsible for causing the display of the corresponding focus item in association with the control item.

FIG. 15 is a logical flow diagram that illustrates the steps for interrogating a control object 210, as conducted by the computer-implemented routine 1420. The focus object 208 can interrogate the control object 210 receiving focus to determine the position of the control item representing this control object 210. In this manner, the focus object 208 also obtains parameters defining the size and shape of this control item. This allows the appearance of the focus item to be adapted, as required, to the size and shape of the control item.

At step 1421, an inquiry is conducted to determine whether the control item receiving focus is a "visual" control item, i.e., a control item to be displayed for viewing by the user. If not, the "NO" branch is followed and an error message is returned at step 1422. However, if the control item receiving focus is a visual control item, then the "YES" branch is followed from step 1421 to step 1423. In step 1423, a determination is made whether the control item receiving focus is already displayed by the graphical viewer interface 100. If the control item is not currently displayed, the "NO" branch is followed to step 1424 and a "default" control item display is retrieved and displayed by the graphical viewer interface 100 on the screen 95. In contrast, if the control item is indeed displayed, then the "YES" branch is followed from step 1423 to step 1425. In step 1425, the focus object 208 obtains the position and the configuration of the control item receiving focus, including the size and shape of this control item.

FIG. 16 is a logical flow diagram that illustrate the steps with a computer-implemented routine 1600 that is responsible for the display of the screen 95 in a graphical viewer interface 100. In short, the steps illustrated in FIG. 16 are responsible for creating a basic top level frame that fills the display screen, which can include a background of active video or other display elements that are provided by portions of the set-top terminal software not forming a part of the present invention, determining the spites that form any control objects to be displayed, and constructing the control objects for a given frame. Starting at step 1601, the first step taken is to create a top level frame that forms the background for any associated control items that are displayed. This top level frame is typically created in a display buffer in the memory 64 of the set top terminal 48, prior to its conversion to video for display on a television set or provision to a graphics board if a computer monitor. At step 1603, the top level frame is registered as a frame object.

At step 1605, the inquiry is made as to whether the top level frame has any child objects. As previously described, it will be recalled that there must always be at least one top level frame for display by the set-top terminal; this top level frame can merely consist of an NTSC television frame, or other graphic display generated by the application program 66 if running. However, the top level frame can have one or more child objects, constructed as described herein. If the top level frame has a child object, the "yes" branch is followed to step 1611, and the relative Z order for each child object is obtained, by retrieving the Z order attribute from the control object child.

At step 1613, the inquiry is made whether there are any more child objects associated with the top level frame. If so, the "yes" branch is followed back to step 1611. These steps are repeated until all child control objects, and associated child objects of such control objects, are retrieved. At step 1613, after the relative Z order of each child object is obtained, the "no" branch is taken to step 1620, where a master Z list is constructed for all objects in the hierarchy of the top level frame object. In other words, the hierarchy tree such as that shown in FIG. 7 is traversed by following the *parent and *child (n) pointers, obtaining the relative Z order for all objects in the hierarchy, so that a master Z list is assembled. This master Z list includes all sprites and objects of sprites that are to be displayed.

At step 1622, an index i for counting the total Z order is set to the value of P, where P is the highest number in the master Z list. In accordance with known principles of Z buffering, the master Z list is consulted in descending order so that the bottommost control items are displayed first, and successively overlaid with top layers having higher (that is lower numerical) Z orders are displayed to provide requisite layering.

At inquiry box 1625, the inquiry is made as to whether object (i), that is the object is represented by the index i associated with a given control object being interrogated at this instant in time, has its own sprite. If the response to this inquiry is affirmative, the "yes" branch is taken to step 1629, and the control item or element associated with the control object represented by the index i is drawn onto the requisite sprite surface. In the preferred embodiments, this is effected by retrieving from memory associated with the control object the graphical elements (e.g. ElemShape, ElemText, ElemPicture, etc.) forming the control item, associated with the appropriate values of state, alpha, and the like, and rendered into a device independent bitmap (DIB) in a predetermined memory location associated with the sprite associated with object (i).

From step 1629, control passes to step 1631, where the index i is decremented and control passes to step 1635, where the inquiry is made whether the value of the index i equals 0. When i has reached 0, all child objects have been examined and drawn into an appropriate sprite surface. If control objects remain to be drawn, the "no" branch is taken from step 1635 back to step 1625.

Returning to step 1625, ff the given object (i) does not have a sprite, the "no" branch is taken to step 1639. In this step, the control item associated with this control object, being a shared (S) which indicates that the control item shares a spite surface with a parent, and the control item is then drawn into the parent's spite surface or DIB. In preferred embodiments of the present invention, this is effected by a bit block transfer or "BITBLT" operation that replaces or overlays the geometric region of the child control item into the DIB of the parent's spite drawing surface or DIB. The effect is to replace the pixel values of the parent with the pixel values of the child, at an appropriate displacement of the child's control item relative to the coordinates of the parent's DIB.

From step 1639, control passes to step 1631 as described above.

Returning to step 1635, when the value of the object index i has reached 0, all control objects to be drawn have been examined, and control follows the "yes" branch to step 1641. In this step, a list is created of all sprites, in relative Z order, that now have contained therein any child objects that share a surface with the sprite. In other words, the DIBs associated with all control items that have their own sprites are now completed in the memory of the set type terminal, and are ready to be placed onto the display screen buffer by the spite manager module. Control then passes to step 1600, and a list of pointers to the sprites are then passed to the Sprite Manager. The steps associated with the Sprite Manager, shown at 220 in FIG. 10, are shown in FIG. 17.

FIG. 17 is a logical flow diagram of steps comprising the Sprite Manager, and illustrates the steps for displaying all sprites in relative Z order at a rate determined typically by the desired display rate of the hardware architecture supported by the set-top terminal 48. For a typical television set display, the Sprite Manager causes generation of frames at approximately 60 frames per second 30 alternating frames per second for interlaced scanning), the standard NTSC frame rate, independently of the rate at which the sprites are drawn into their DIBs and independently of other software functions carried out in the set-top terminal. This ensures an adequate refresh rate and minimizes perceptible flicker. Accordingly, it will be understood that the Sprite Manager routine 1700 executes independently to retrieve the DIBs for all sprites to be drawn, as well as the relative locations of the sprites relative to the display screen as a whole, given any screen safe areas or other constraints, and creates appropriate video signals that are provided as the output from the set-top terminal 48.

It should be further understood that the Sprite Manager is operative to display the sprites in relative Z Order, so as to create appropriate layering and other desired graphical effects. The Sprite Manager is based upon the familiar Z-buffer algorithm that is known to those skilled the art. The routine shown in FIG. 17 requires a frame buffer in which color values are stored, and a Z list that stores a Z value for each control item. Initially, the frame buffer is initialized to a background color, which as described above can represent a frame of a video image or any other graphical image to be displayed. Control items are scan-converted into the frame buffer in succession. During the scan-conversion process, if a point (x, y) of a control item being scan-converted is no farther from the viewer than is the point whose color and depth represented by the Z value currently in the frame buffer, then the new point's color and depth replace the old values.

Starting at step 1701, the first step taken is to initialize by setting an index j equal to S, where S is the number of sprites to be drawn. The values of variables x and y for scan-conversion are nominally set to the origin at the upper left-hand corner of the display screen (FIG. 2) to begin the process of scanning across in the x direction and down in the y direction from the origin (x=0, y=0).

At step 1707, the inquiry is made as to whether y equals YMAX, where YMAX is the bottommost extent of the display screen (i.e., the last scan line). If not, there are further scan lines to be drawn, and control passes to step 1709.

At step 1709, the inquiry is made as to whether x equals XMAX, where XMAX is the rightmost extent of a given scan line. If this inquiry is negative, the "no" branch is taken to step 1711, and the operation WritePixel (x, y, BACKGROUND_VALUE) and WriteZ (x, y, 0) is carried out.

In the WritePixel operation, a color value represented by BACKGROUND_VALUE is written at the current (x, y) location, and a nominal Z value of 0 is written for each pixel in the frame buffer.

Control passes to step 1717, where x is incremented, and the process returns to step 1709. These steps are carried out repeatedly for a given scan line in the x direction, until at step 1709 x equals XMAX, and control passes to step 1719.

At step 1719, x is reset to 0 to begin a new scan line, y is incremented, and control is returned to step 1707.

At step 1707, when y has reached YMAX, all scan lines have now been processed—the Z value for the background is set to 0 and the color value for each pixel location is set to the value of BACKGROUND_VALUE. Control then follows the "yes" branch from step 1707 to step 1730.

At step 1730, the inquiry is made as to whether j has reached 0. When j reaches 0, all sprites will have been drawn into the frame buffer and a program can follow the "yes" branch to exit. If j does not equal 0, the "no" branch is taken to step 1735. At step 1735, is the beginning of a process of drawing a sprite DIB in the frame buffer at a predetermined location indicated by a relative displacement of that sprite, represented by the value of variables RELx and RELy, which indicate relative x and relative y values. To initialize, the values of RELx and RELy are set to 0, and the value of a temporary variable PZ is set to the Z value of the pixel at location RELx and RELy. This sets up the Z value for the first pixel at a location upon which a sprite is to be drawn.

Control then passes to step 1739, where the inquiry is made whether the value of the temporary variable RELy equals SpriteYMAX. The value SpriteYMAX indicates the extent in the y direction of the sprite, that is, the height of the DIB in pixels. If the variable RELy has not reached SpriteYMAX, then there are further y lines of the DIB of the sprite to be examined and drawn. Control then passes to step 1743.

At step 1743, the value of a temporary variable RELx is examined to determined whether it has reached SpriteXMAX, where SpriteXMAX is the horizontal extent (width) of the sprite in pixels. If RELx has not reached SpriteXMAX, there are further pixels to be examined along this scan line, and control passes to step 1745.

At step 1745, the inquiry is made whether the temporary variable PZ is greater than the present Z value of the sprite being drawn at the present location (x, y). If the value of PZ is greater than the Z value of the sprite being drawn, the "yes" branch is taken to step 1749. At step 1749, the Z value represented by the pixel being examined is greater than the Z value of the sprite, indicating that the color value present in the frame buffer should not be replaced since it is "below" a value that may have been placed in the frame buffer by another control item or sprite having a higher Z value. Therefore, the color value of the pixel is left alone. The value of the x variable RELx is incremented, and control passes to step 1743.

If at step 1745 the value of PZ is not greater than the Z value of the sprite, then it is indicated that the color value of the sprite should be drawn into the frame buffer to replace the present color value at that pixel location. Thus, the "no" branch is taken from step 1745, and control passes to step 1751. At step 1751, the value of the temporary Z variable PZ written into the frame buffer at the location indicated by RELx and RELy so subsequent examination of this pixel location will have the appropriate (updated) Z value to examine.

Then, the color value of the sprite represented by COLOR_VALUE is drawn into the frame buffer with the WritePixel (RELx, RELy, COLOR_VALUE) operation. This occurs at the location indicated by using RELx and RELy as offsets with respect to the location of the sprite relative to the display screen. It will be understood that the WritePixel operation is responsive to determine an appropriate color value for the pixel, represented by COLOR_VALUE, as a function of any appropriate attributes of the object associated with this particular sprite. For example, if the color value of the pixel is affected by a visibility attribute or an alpha attribute associated with the corresponding control object, the COLOR_VALUE is adjusted accordingly prior to writing the value into the frame buffer.

Control then passes to step 1749.

Returning to step 1743, when the value of the x variable RELx has reached SpriteXMAX, the rightmost extent of the sprite has now been encountered, and control follows the "yes" branch to step 1759. At this step, the value of the temporary x variable RELx is reset to 0, RELy is incremented, and control passes back to step 1739.

When at step 1739, the value of RELy equals SpriteYMAX, all pixel locations in the sprite have been examined to determine whether their color value should replace the color value in the frame buffer. As discussed above, this replacement will occur if the Z value of the sprite indicates a higher placement of the sprite relative to the values that are currently present in the frame buffer, as possibly indicated by prior operations for other sprites that have been drawn in their appropriate Z order.

Control passes from 1739 to step 1765, where the sprite counter j is decremented, and the routine returns to step 1730 for determination whether there are other sprites to be drawn into the frame buffer. As mentioned earlier, when all sprites have been drawn into the frame buffer, j reaches 0 and the Sprite Manager exits by following the "yes" branch from step 1730.

It will be appreciated that the steps shown in FIG. 17 may be drawn into the frame buffer in arbitrary order. That is, there is no requirement that the sprites drawn be drawn in sprite order or in Z order. All that is required is that each sprite contain an appropriate Z value, as maintained by the master Z list for all control objects (FIG. 16).

From the foregoing, it will be understood and appreciated that there has been described a sprite-based customizable graphical user or viewer interface construction system. The description above enables one skilled in the art to construct an object-oriented user or viewer interface comprising a set of elements that can be selected and arranged to build up more complex objects comprising control items associated with control objects. The control items can be arranged in a hierarchical fashion, that is, a control item that is a parent can have child control items such as buttons, arrows and text, receive focus when a user tabs to or moves a cursor to the control item, and receive a command by activating an appropriate button on a remote control device or other input device. The hierarchical construction arrangement allows independent manipulation of control elements with exciting effects such as "fly together" translations of control items, imposition of various types of focus to control items, and other effects.

It will also be understood that the described parent/child relationship of various control objects fosters features resulting from inheritability. Aspects of position, Z ordering, and visible properties, such as shadowing, redraw, visibility, and state, are inheritable. Thus, if a parent control item, represented by parent control object, is made invisible, all child objects of that parent are made invisible. On the other hand, a child object may be separately manipulated, for example moved away from a parent object in a series of successive frames, and the operation does not extend upwardly in the hierarchy to ancestor objects. This permits dynamic manipulation of elements forming a control item.

It will be further understood that control items are built up from an array of state views. These state views correspond to DIBs associated with the various states that the control item can experience, e.g., disabled, enabled, selected, pushed. The state views can comprise separate display elements, or can comprise collection of elements that are combined as described herein to create a composite state view (in which the case the combined elements cannot be separately manipulated). Uncombined elements having their own state views can be manipulated under program control to create visual effects such as zooms, rotates, translations, size change, fly togethers and fly aparts.

The various state views are displayed in their appropriate Z-order, preferably by a sprite engine, onto their parents object's sprite surface, to display a fully constructed control item that underlies a control object. The constructed control item can then be subjected to the displays associated with the various states that control assume as a function of user input.

In view of the foregoing, the present invention addresses the need within the interactive network environment for a system for supplying information that allows a viewer to readily recognize which control function has been selected for operation and to identify remaining control functions that are available for selection. Within the interactive network environment, control items are presented by an output device such as a television display or monitor, to represent the control functions for the interactive network.

Those skilled in the art will appreciate that the present invention can be extended to other operating environments, including graphical user interfaces for computers, including desktop computer, handheld computers, and personal digital administrators.

It should be understood that the foregoing relates only to the preferred embodiment of the present invention, and that numerous changes may be made therein without departing from the spirit and scope of the invention as defined by the following claims.

What is claimed is:

1. In a computer system for running program modules, a method of displaying a control item on a display screen and for graphically manipulating user controls imparted to the control item via a user input device, comprising the steps of:
   providing a plurality of control objects, each of the plurality of control objects having at least one control item associated therewith;
   arranging the plurality of control objects in a hierarchy with at least one parent control object and at least one child control object associated with the parent control object;
   displaying a parent control item associated with the parent control object on the display screen;

displaying a child control item associated with the child control object on the display screen;

in response to a predetermined first condition, manipulating the parent control item and the child control item to cause a first predetermined user interface effect; and in response to the relocation under program control of the child control item from a first predetermined location to a second predetermined location in a series of successive display frames, manipulating the child control item relative to the parent control item to cause the relocation of the child control item independently of the parent control item.

2. The method of claim 1, wherein the user input device is a handheld remote control device coupled to an interactive television set-top terminal.

3. The method of claim 2, wherein the display screen is a television set coupled to the interactive television set-top terminal.

4. The method of claim 1, wherein the parent control item is a control button.

5. The method of claim 1, wherein the parent control item is a composite control item comprising a collection of control items associated with other child control objects.

6. The method of claim 5, wherein the parent control item is a spin dial including child control elements of a graphical box control element and an arrow control element.

7. The method of claim 1, wherein the control items comprise audiovisual elements.

8. The method of claim 7, wherein the control item is selected from the group comprising: a shape item, a text item, a picture item, a sound item, a list item, a video item, or an alignment item.

9. The method of claim 1, wherein the predetermined first condition is generated under program control of an application program that incorporates a program module implementing the method.

10. The method of claim 1, wherein the predetermined first condition comprises the relocation under program control of the parent control item from a first predetermined location to a second predetermined location in a series of successive display frames, and wherein the first predetermined user interface effect is the relocation of the parent control item and the child control item while maintaining the spatial relationship between the parent control item and the child control item.

11. The method of claim 1, wherein the predetermined first condition comprises a change to a visible attribute of the parent control item in a series of successive display frames, and wherein the first predetermined user interface effect is change of the visible attributes of the parent control item and the child control item.

12. The method of claim 1, wherein the predetermined first condition is related to the provision of user input from the user input device.

13. The method of claim 1, further comprising the step of: imparting predetermined properties of the parent control item associated with the parent control object to the child control item associated with the child control object.

14. The method of claim 1, further comprising the step of, in response to a change to a visible attribute of the child control item in a series of successive display frames, changing the visible attributes of the child control item independently of the parent control item.

15. A computer system for displaying a control item on a display screen and for graphically manipulating user controls imparted to the control item via a user input device, comprising:

a display screen;

a memory for storing a plurality of control objects, each of the plurality of control objects having at least one control item associated therewith;

the plurality of control objects being arranged in a hierarchy with at least one parent control object and at least one child control object associated with the parent control object;

a central processing unit (CPU) coupled to the memory and the display screen operative for:

displaying a parent control item associated with the parent control object on the display screen;

displaying a child control item associated with the child control object on the display screen;

in response to a predetermined first condition, manipulating the parent control item and the child control item to cause a first predetermined user interface effect; and in response to the relocation under program control of the child control item from a first predetermined location to a second predetermined location in a series of successive display frames, manipulating the child control item relative to the parent control item to cause the relocation of the child control item independently of the parent control item.

16. The system of claim 15, wherein the user input device is a handheld remote control device coupled to an interactive television set-top terminal.

17. The system of claim 16, wherein the display screen is a television set coupled to the interactive television set-top terminal.

18. The system of claim 15, wherein the parent control item is a control button.

19. The system of claim 15, wherein the parent control item is a composite control item comprising a collection of control items associated with other child control objects.

20. The system of claim 19, wherein the parent control item is a spin dial including child control elements of a graphical box control element and an arrow control element.

21. The system of claim 15, wherein the control items comprise audiovisual elements.

22. The system of claim 21, wherein the control item is selected from the group comprising: a shape item, a text item, a picture item, a sound item, a list item, a video item, or an alignment item.

23. The system of claim 15, wherein the predetermined first condition is generated under program control of an application program.

24. The system of claim 15, wherein the predetermined first condition comprises the relocation under program control of the parent control item from a first predetermined location to a second predetermined location in a series of successive display frames, and wherein the first predetermined user interface effect is the relocation of the parent control item and the child control item while maintaining the spatial relationship between the parent control item and the child control item.

25. The system of claim 15, wherein the predetermined first condition comprises a change to a visible attribute of the parent control item in a series of successive display frames, and wherein the first predetermined user interface effect is change of the visible attributes of the parent control item and the child control item.

26. The system of claim 15, wherein the predetermined first condition is related to the provision of user input from the user input device.

27. The system of claim 15, wherein the CPU is further operative for imparting predetermined properties of the parent control item associated with the parent control object to the child control item associated with the child control object.

28. The system of claim 15, further comprising the step of, in response to a change to a visible attribute of the child control item in a series of successive display frames, changing the visible attributes of the child control item independently of the parent control item.

* * * * *